United States Patent
Mangla et al.

(10) Patent No.: US 12,340,571 B2
(45) Date of Patent: Jun. 24, 2025

(54) USING INTRINSIC MULTIMODAL FEATURES OF IMAGE FOR DOMAIN GENERALIZED

(71) Applicant: ADOBE INC., San Jose, CA (US)

(72) Inventors: Puneet Mangla, Ballabgarh (IN); Milan Aggarwal, Delhi (IN); Balaji Krishnamurthy, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 410 days.

(21) Appl. No.: 17/976,541

(22) Filed: Oct. 28, 2022

(65) Prior Publication Data

US 2024/0153258 A1    May 9, 2024

(51) Int. Cl.
| | |
|---|---|
| G06V 10/80 | (2022.01) |
| G06F 40/40 | (2020.01) |
| G06V 10/764 | (2022.01) |
| G06V 10/77 | (2022.01) |
| G06V 10/774 | (2022.01) |

(Continued)

(52) U.S. Cl.
CPC ............ G06V 10/811 (2022.01); G06F 40/40 (2020.01); G06V 10/764 (2022.01); G06V 10/7715 (2022.01); G06V 10/774 (2022.01); G06V 10/82 (2022.01); G06V 10/86 (2022.01)

(58) Field of Classification Search
CPC ....... G06V 40/19; G06V 40/176; G06F 3/017
See application file for complete search history.

(56) References Cited

U.S. PATENT DOCUMENTS

| | | | | |
|---|---|---|---|---|
| 8,913,831 B2* | 12/2014 | Bergman | .................. | G06T 7/11 |
| | | | | 382/173 |
| 9,785,242 B2* | 10/2017 | Parshionikar | .......... | G06V 40/19 |

(Continued)

OTHER PUBLICATIONS

Hoyer, L., et al., "DAFormer: Improving Network Architectures and Training Strategies for Domain-Adaptive Semantic Segmentation", arXiv:2111.14887, pp. 1-19 (Nov. 29, 2021).

(Continued)

*Primary Examiner* — Yosef Kassa
(74) *Attorney, Agent, or Firm* — Shook, Hardy & Bacon L.L.P.; Joseph W. Cruz

(57) ABSTRACT

Various embodiments classify one or more portions of an image based on deriving an "intrinsic" modality. Such intrinsic modality acts as a substitute to a "text" modality in a multi-modal network. A text modality in image processing is typically a natural language text that describes one or more portions of an image. However, explicit natural language text may not be available across one or more domains for training a multi-modal network. Accordingly, various embodiments described herein generate an intrinsic modality, which is also a description of one or more portions of an image, except that such description is not an explicit natural language description, but rather a machine learning model representation. Some embodiments additionally leverage a visual modality obtained from a vision-only model or branch, which may learn domain characteristics that are not present in the multi-modal network. Some embodiments additionally fuse or integrate the intrinsic modality with the visual modality for better generalization.

20 Claims, 15 Drawing Sheets
(3 of 15 Drawing Sheet(s) Filed in Color)

(51) Int. Cl.
G06V 10/82 (2022.01)
G06V 10/86 (2022.01)

(56) References Cited

U.S. PATENT DOCUMENTS

| | | | | |
|---|---|---|---|---|
| 10,489,682 | B1* | 11/2019 | Kumar | G06V 30/19133 |
| 10,515,429 | B2* | 12/2019 | Rhoads | G06T 7/32 |
| 10,678,846 | B2* | 6/2020 | Gordo Soldevila | G06N 3/084 |
| 10,699,358 | B2* | 6/2020 | Lancioni | G06T 7/136 |

OTHER PUBLICATIONS

Jia, C., et al., "Scaling Up Visual and Vision-Language Representation Learning With Noisy Text Supervision", In Proceedings of the 38th International Conference on Machine Learning, PMLR, Retrieved from Internet URL : <https://proceedings.mlr.press/v139/jia21b.html>, PMLR 139, pp. 4904-4916 (2021).
Kamath, A., et al., "MDETR—Modulated Detection for End-to-End Multi-Modal Understanding", In Proceedings of the IEEE/CVF International Conference on Computer Vision (ICCV), pp. 1780-1790 (2021).
Khan, S., et al., "Transformers in Vision: A Survey", ACM Computing Surveys, arXiv:2101.01169, vol. 54, No. 10, pp. 1-30 (Jan. 19, 2022).
Li, L., et al., "Progressive Domain Expansion Network for Single Domain Generalization", In Proceedings of the IEEE/CVF Conference on Computer Vision and Pattern Recognition (CVPR), pp. 224-233 (2021).
Li, S., et al., "Few-Shot Domain Adaptation with Polymorphic Transformers", MICCAI, arXiv:2107.0480, pp. 1-13 (Jul. 10, 2021).
Li, X., et al., "OSCAR: Object-Semantics Aligned Pre-training for Vision-Language Tasks", ECCV, arXiv:2004.06165, pp. 1-21 (Jul. 26, 2020).
Li, Y., et al., "Deep Domain Generalization via Conditional Invariant Adversarial Networks", In Proceedings of the European Conference on Computer Vision (ECCV), pp. 624-639 (2018).
Lu, J., et al., "ViLBERT: Pretraining Task-Agnostic Visiolinguistic Representations for Vision-and-Language Tasks", In 33rd Conference on Neural Information Processing Systems (NeurIPS), pp. 13-23 (2019).
Luo, H., et al., "CLIP4Clip: An Empirical Study of CLIP for End to End Video Clip Retrieval", arXiv:2104.08860, pp. 1-14 (May 8, 2021).
Maaz, M., "Multi-modal Transformers Excel at Class-agnostic Object Detection", arXiv:2111.11430, pp. 1-17 (Nov. 22, 2021).
Mancini, M., et al., "Towards Recognizing Unseen Categories in Unseen Domains", arXiv:2007.12256, pp. 1-21 (Aug. 11, 2020).
Mangla, P., et al., "COCOA: Context-Conditional Adaptation for Recognizing Unseen Classes in Unseen Domains", In Proceedings of the IEEE/CVF Winter Conference on Applications of Computer Vision (WACV), pp. 865-874 (2022).
Maniyar, U., et al., "Zero Shot Domain Generalization", CVPR, arXiv:2008.07443, pp. 1-17 (Aug. 17, 2020).
Mu, N., et al., "SLIP: Self-supervision meets Language-Image Pre-training", arXiv:2112.12750, pp. 1-13 (Dec. 23, 2021).
Muandet, K., et al., "Domain Generalization via Invariant Feature Representation", arXiv abs/1301.2115, pp. 1-20 (Jan. 10, 2013).
Naseer, M., et al., "On Improving Adversarial Transferability of Vision Transformers", arXiv:2106.04169, pp. 1-19 (Nov. 1, 2021).
Pandey, P., et al., "Generalization on Unseen Domains via Inference-time Label-Preserving Target Projections", In EEE/CVF Conference on Computer Vision and Pattern Recognition (CVPR), pp. 12924-12933 (2021).
Patashnik, O., et al., "StyleCLIP: Text-Driven Manipulation of StyleGAN Imagery", In Proceedings of the IEEE/CVF International Conference on Computer Vision (ICCV), pp. 2085-2094 (2021).
Qiao, F., et al., "Learning to Learn Single Domain Generalization", In IEEE/CVF Conference on Computer Vision and Pattern Recognition (CVPR), pp. 12556-12565 (2020).
Sariyildiz, M., B., et al., "Learning Visual Representations with Caption Annotations", In European Conference on Computer Vision (ECCV), arXiv:2008.01392, pp. 1-28 (Aug. 4, 2020).
Segu, M., et al., "Batch Normalization Embeddings for Deep Domain Generalization", arXiv:2011.12672, pp. 1-15 (Nov. 26, 2020).
Seo, S., et al., "Learning to Optimize Domain Specific Normalization for Domain Generalization", ECCV, arXiv:1907.04275, pp. 1-16 (Jul. 21, 2020).
Shankar, S., et al., "Generalizing Across Domains via Cross-Gradient Training", ICLR, arXiv:1804.10745, pp. 1-12 (May 1, 2018).
Steiner, A., et al., "How to train your ViT? Data, Augmentation, and Regularization in Vision Transformers", In Transactions on Machine Learning Research, arXiv:2106.10270, pp. 1-14 (Jun. 18, 2021).
Tan, H., and Bansal, M., "LXMERT: Learning Cross-Modality Encoder Representations from Transformers", In Proceedings of the Conference on Empirical Methods in Natural Language Processing, pp. 1-14 (Dec. 3, 2019).
Torralba, A., and Efros, A., A., "Unbiased Look at Dataset Bias", CVPR, IEEE, pp. 1521-1528 (2011).
Volpi, R., et al., "Generalizing to Unseen Domains via Adversarial Data Augmentation", In 32nd Conference on Neural Information Processing Systems (NeurIPS), pp. 1-11 (2018).
Wang, J., et al., "Generalizing to Unseen Domains: A Survey on Domain Generalization", In Proceedings of the Thirtieth International Joint Conference on Artificial Intelligence (IJCAI), pp. 4627-4635 (2021).
Wang, Y., et al., "Domain Generalization for Vision-based Driving Trajectory Generation", CVPR, arXiv:2109.13858, pp. 1-7 (Sep. 22, 2021).
Xie, E., et al., "SegFormer: Simple and Efficient Design for Semantic Segmentation with Transformers", In 35th Conference on Neural Information Processing Systems (NeurIPS), pp. 1-14 (2021).
Xu, H., et al., "VideoCLIP: Contrastive Pre-training for Zero-shot Video-Text Understanding", In Proceedings of the 2021 Conference on Empirical Methods in Natural Language Processing, Retrieved from Internet URL : <https://aclanthology.org/2021.emnlp-main.544>, pp. 6787-6800 (Nov. 2021).
Xu, Z., et al., "Exploiting Low-Rank Structure from Latent Domains for Domain Generalization", ECCV, Part III, LNCS 3691, pp. 628-643 (2014).
Yang, P., and Gao, W., "Multi-View Discriminant Transfer Learning", In Proceedings of the Twenty-Third International Joint Conference on Artificial Intelligence, pp. 1848-1854 (2013).
Yue, X., et al., "Domain Randomization and Pyramid Consistency: Simulation-to-Real Generalization Without Accessing Target Domain Data", In Proceedings of the IEEE/CVF International Conference on Computer Vision (ICCV), pp. 2100-2110 (2019).
Zhang, P., et al., "VinVL: Making Visual Representations Matter in Vision-Language Models", CVPR, arXiv:2101.00529, pp. 1-30 (Jan. 2, 2021).
Zhang, R., et al., "PointCLIP: Point Cloud Understanding by CLIP", CVPR, arXiv:2112.02413, pp. 1-13 (Dec. 4, 2021).
Zhou, K., et al., "Domain Generalization: A Survey", arXiv:2103.02503, pp. 1-21 (Mar. 29, 2021).
Zhou, K., et al., "Domain Generalization with MixStyle", ICLR, arXiv:2104.02008, pp. 1-15 (Apr. 5, 2021).
Zhou, X., et al., "Detecting Twenty-thousand Classes using Image-level Supervision", arXiv:2201.02605, pp. 1-27 (Jul. 29, 2022).
Zhu, X., et al., "Deformable DETR: Deformable Transformers for End-to-End Object Detection", ICLR, arXiv:2010.04159, pp. 1-16 (Mar. 18, 2021).
Arjovsky, M., et al., "Invariant Risk Minimization", arXiv:1907.02893, pp. 1-31 (Sep. 1, 2019).
Arpit, D., et al., "Ensemble of Averages: Improving Model Selection and Boosting Performance in Domain Generalization", 36th Conference on Neural Information Processing Systems (NeurIPS), arXiv:2110.10832, pp. 1-18 (Oct. 26, 2021).
Blanchard, G., et al., "Domain Generalization by Marginal Transfer Learning", Journal of Machine Learning Research, Retrieved from Internet URL : <http://jmlr.org/papers/v22/17-679.html>, vol. 22, pp. 1-55 (2021).

(56) References Cited

OTHER PUBLICATIONS

Cha, J., et al., "SWAD: Domain Generalization by Seeking Flat Minima", In 35th Conference on Neural Information Processing Systems (NeurIPS), vol. 34, pp. 1-14 (2021).
Chen, C., F., R., et al., "CrossVIiT: Cross-Attention Multi-Scale Vision Transformer for Image Classification", In International Conference on Computer Vision (ICCV), IEEE, pp. 357-366 (2021).
Deng, J., et al., "ImageNet: A Large-Scale Hierarchical Image Database", In IEEE conference on computer vision and pattern recognition, pp. 248-255 (2009).
Desai, K., and Johnson, J., "VirTex: Learning Visual Representations from Textual Annotations", In IEEE/CVF Conference on Computer Vision and Pattern Recognition (CVPR), pp. 11162-11173 (2021).
Dosovitskiy, A., et al., "An Image is Worth 16X16 Words: Transformers for Image Recognition at Scale", In International Conference on Learning Representations, Retrieved from Internet URL : <https://openreview.net/forum?id=YicbFdNTTy>, pp. 1-21 (2021).
Ganin, Y., et al., "Domain-adversarial training of neural networks", Journal of Machine Learning Research, vol. 17, pp. 1-35 (May 26, 2016).
Geirhos, R., et al., "Imagenet-Trained CNNS are Biased Towards Texture; Increasing Shape Bias Improves Accuracy and Robustness", In International Conference on Learning Representations, Retrieved from Internet URL : <https://openreview.net/forum?id=Bygh9j09KX>, pp. 1-22 (2019).
Gulrajani, I., and Lopez-Paz, D., "In Search of Lost Domain Generalization", In International Conference on Learning Representations, Retrieved from Internet URL : <https://openreview.net/forum?id=IQdXeXDoWtl>, pp. 1-29 (2021).
Huang, Z., et al., "Self-Challenging Improves Cross-Domain Generalization", ECCV, arxiv:2007.02454, pp. 1-20 (Jul. 5, 2020).
Kim, D., et al., "SelfReg: Self-supervised Contrastive Regularization for Domain Generalization", In: Proceedings of the IEEE/CVF International Conference on Computer Vision, pp. 9619-9628 (2021).
Krueger, D., et al., "Out-of-Distribution Generalization via Risk Extrapolation", In Proceedings of the 38th International Conference on Machine Learning, Retrieved from Internet URL : <https://proceedings.mlr.press/v139/krueger21a.html>, vol. 139, pp. 5815-5826 (2021).
Li, D., et al., "Deeper, Broader and Artier Domain Generalization", In Proceedings of the IEEE International Conference on Computer Vision (ICCV), pp. 5542-5550 (2017).
Li, D., et al., "Learning to Generalize: Meta-Learning for Domain Generalization", In Thirty-Second AAAI Conference on Artificial Intelligence , vol. 32 No. 1, pp. 3490-3497 (2018).
Li, D., et al., "Episodic Training for Domain Generalization", In Proceedings of the IEEE International Conference on Computer Vision, pp. 1446-1455 (2019).
Li, H., et al., "Domain Generalization with Adversarial Feature Learning", In IEEE/CVF Conference on Computer Vision and Pattern Recognition, pp. 5400-5409 (2018).
Li, J., et al., "Align before Fuse: Vision and Language Representation Learning with Momentum Distillation", In 35th Conference on Neural Information Processing Systems (NeurIPS), vol. 34, pp. 1-12 (2021).
Li, Y., et al., "Domain Generalization via Conditional Invariant Representations", The Thirty-Second AAAI Conference on Artificial Intelligence (AAAI), Retrieved from Internet URL : <https://ojs.aaai.org/index.php/AAAI/article/view/11682>, vol. 32, No. 1, pp. 3579-3587 (2018).
Li, Y., et al., "Supervision Exists Everywhere: A Data Efficient Contrastive Language-Image Pre-Training Paradigm", ICLR, arXiv:2110.05208, pp. 1-18 (Oct. 11, 2021).
Li, Y., et al., "Feature-Critic Networks for Heterogeneous Domain Generalization", In Proceedings of the 36 th International Conference on Machine Learning, PMLR, vol. 97, pp. 1-10 (2019).
Mancini, M., et al., "Towards Recognizing Unseen Categories in Unseen Domains", In: Proceedings of the European Conference on Computer Vision (ECCV), pp. 1-21 (Aug. 11, 2020).

Nam, H., et al., "Reducing Domain Gap by Reducing Style Bias", In Proceedings of the IEEE/CVF Conference on Computer Vision and Pattern Recognition (CVPR), pp. 8690-8699 (2021).
Naseer, M., et al., "Intriguing Properties of Vision Transformers", In 35th Conference on Neural Information Processing Systems (NeurIPS), Retrieved from Internet URL : <https://openreview.net/forum?id=o2mbl-Hmfgd>, pp. 1-13 (2021).
Peng, X., et al., "Moment Matching for Multi-Source Domain Adaptation", In Proceedings of the IEEE/CVF International Conference on Computer Vision (ICCV), pp. 1406-1415 (2019).
Radford, A., et al., "Learning Transferable Visual Models From Natural Language Supervision", In Proceedings of the 38 th International Conference on Machine Learning, PMLR, vol. 139, pp. 1-16 (2021).
Rame, A., et al., "Fishr: Invariant Gradient Variances for Out-of-Distribution Generalization", arXiv:2109.02934, pp. 1-32 (Oct. 17, 2021).
Sagawa, S., et al., "Distributionally Robust Neural Networks", In International Conference on Learning Representations, Retrieved from Internet URL : <https://openreview.net/forum?id=ryxGuJrFvS>, pp. 1-18 (2020).
Shahtalebi, S., et al., "SAND-mask: An Enhanced Gradient Masking Strategy for the Discovery of Invariances in Domain Generalization", Retrieved from Internet URL : <https://arxiv.org/abs/2106.02266>, pp. 1-20 (Sep. 26, 2021).
Shu, Y., et al., "Open Domain Generalization with Domain-Augmented Meta-Learning", In Proceedings of the IEEE/CVF Conference on Computer Vision and Pattern Recognition (CVPR), pp. 9624-9633 (2021).
Sun, B., and Saenko, K., "Deep CORAL: Correlation Alignment for Deep Domain Adaptation", In ECCV Workshops, pp. 443-450 (2016).
Tolstikhin, I., et al., "MLP-Mixer: An all-MLP Architecture for Vision", In 35th Conference on Neural Information Processing Systems (NeurIPS), Retrieved from Internet URL : <https://openreview.net/forum?id=EI2KOXKdnP>, pp. 1-12 (2021).
Touvron, H., et al., "Training data-efficient image transformers & distillation through attention", In Proceedings of the 38th International Conference on Machine Learning, vol. 139, pp. 10347-10357 (2021).
Venkateswara, H., et al., "Deep Hashing Network for Unsupervised Domain Adaptation", In Proceedings of the IEEE Conference on Computer Vision and Pattern Recognition (CVPR), pp. 5018-5027 (2017).
Wang, H., et al., "Learning Robust Global Representations by Penalizing Local Predictive Power", 33rd Conference on Neural Information Processing Systems (NeurIPS), Retrieved from Internet URL : <https://proceedings.neurips.cc/paper/2019/file/3eefceb8087e964f89c2d59e8a249915-Paper.pdf>, pp. 1-13 (2019).
Zhang, C., et al., "Delving Deep into the Generalization of Vision Transformers under Distribution Shifts", arXiv:2106.07617, pp. 1-17 (Jun. 18, 2021).
Zhang, H., et al., "mixup: Beyond Empirical Risk Minimization", In International Conference on Learning Representations, Retrieved from Internet URL : <https://openreview.net/forum?id=r1Ddp1-Rb>, pp. 1-13 (2018).
Zhang, M., et al., "Adaptive Risk Minimization: Learning to Adapt to Domain Shift", In 35th Conference on Neural Information Processing Systems (NeurIPS), pp. 1-15 (2021).
Balaji, Y., "MetaReg: Towards Domain Generalization using Meta-Regularization", In 32nd Conference on Neural Information Processing Systems (NeurIPS), pp. 1-11 (2018).
Carion, N., et al., "End-to-End Object Detection with Transformers", ECCV, Springer, arXiv:2005.12872, pp. 1-26 (May 28, 2020).
Chandhok, S., et al., "Structured Latent Embeddings for Recognizing Unseen Classes in Unseen Domains", CVPR, arXiv:2107.05622, pp. 1-12 (Jul. 12, 2021).
Chattopadhyay, P., et al., "Learning to Balance Specificity and Invariance for In and Out of Domain Generalization", ECCV, Springer, arXiv:2008.12839, pp. 1-24 (Aug. 28, 2020).
Chen, X., et al., "When Vision Transformers Outperform ResNets without Pre-training or Strong Data Augmentations", CLR, arXiv:2106.01548, pp. 1-19 (Oct. 11, 2021).

(56) References Cited

OTHER PUBLICATIONS

Chen, Y., C., et al., "UNITER: UNiversal Image-TExt Representation Learning", In ECCV, Springer, arXiv:1909.11740, pp. 1-26 (Jul. 17, 2020).

Degrave, A., J., et al., "AI for radiographic COVID-19 detection selects shortcuts over signal", medRxiv, pp. 1-24 (2020).

Dou, Q., et al., "Domain Generalization via Model-Agnostic Learning of Semantic Features", In 33rd Conference on Neural Information Processing Systems (NeurIPS), pp. 1-12 (2019).

Ghifary, M., et al., "Domain Generalization for Object Recognition with Multi-task Autoencoders", In Proceedings of the IEEE International Conference on Computer Vision (ICCV), pp. 2551-2559 (2015).

Gong, B., et al., "Reshaping Visual Datasets for Domain Adaptation", In Proceedings of Advances in Neural Information Processing (NIPS), pp. 1-9 (Dec. 2013).

Gupta, T., et al., "Towards General Purpose Vision Systems", arXiv:2104.00743, pp. 1-13 (Apr. 1, 2021).

* cited by examiner

USING INTRINSIC MULTIMODAL FEATURES OF IMAGE FOR DOMAIN GENERALIZED

BACKGROUND

The goal of Machine learning (ML) is to design a model that can learn general and predictive knowledge from training data, and then apply the model to new data (e.g., test images) across different domains, which is referred to as "domain generalization." In image processing, a "domain" refers to a particular category, manner, format, or style that content exists in, as opposed to the content itself. For example, a first domain may be a drawing of an animal (the content) and a second domain may be photograph of the animal. ML models are trained based on the assumption that training and testing data are identically and independently distributed. However, this assumption does not always hold in reality. When the probability distributions of training data and testing data are different, the performance of ML models often deteriorates due to domain distribution gaps. However, collecting images of all possible domains to train ML models for optimal domain generalization is expensive and even prohibitively impossible.

SUMMARY

Some embodiments described herein solve one or more problems in existing technology by classifying one or more portions of an image based on deriving an "intrinsic" modality (e.g., an un-normalized neural network embedding). Such intrinsic modality acts as a substitute to "text" modality in a multi-modal network, such as a vision-language model. Text modality in a vision-language model is a modality that typically describes, in natural language text, one or more portions of an image. Leveraging text modality is a preferred way to classify an image because text tends to be agnostic across all domains. For example, a vision-language model should be able to predict that natural language text "horse" belongs to an image of a horse, regardless of whether the domain is a drawing, photograph, or painting of the horse. This is because the text modality typically describes the high-level features of the horse (e.g., long snout and mane on neck) instead of the style or other characteristics specific to the domain (e.g., pixel level descriptions of a photograph describing texture of hair). However, explicit natural language text may not be available across one or more domains for training a multi-modal network. Accordingly, various embodiments described herein generate an intrinsic modality, which is also a description of one or more portions of an image, except that such description is not an explicit natural language description, but rather a machine learning model representation.

Some embodiments are additionally directed to leveraging a visual modality obtained from a vision-only model or branch (e.g., a vision transformer), which may learn domain characteristics that are not present in the intrinsic modality to enhance generalization to unseen domains. Some embodiments are additionally or alternatively directed to fusing or integrating the intrinsic modality with the visual modality obtained from a vision transformer in order to generalize better on unseen domains. The use of the intrinsic modality, the vision-only model, and/or the integration of the two improves the classification accuracy, domain generalization, and computer resource consumption relative to existing technologies, among other technical improvements.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein.

DETAILED DESCRIPTION

Overview

Figure 1:
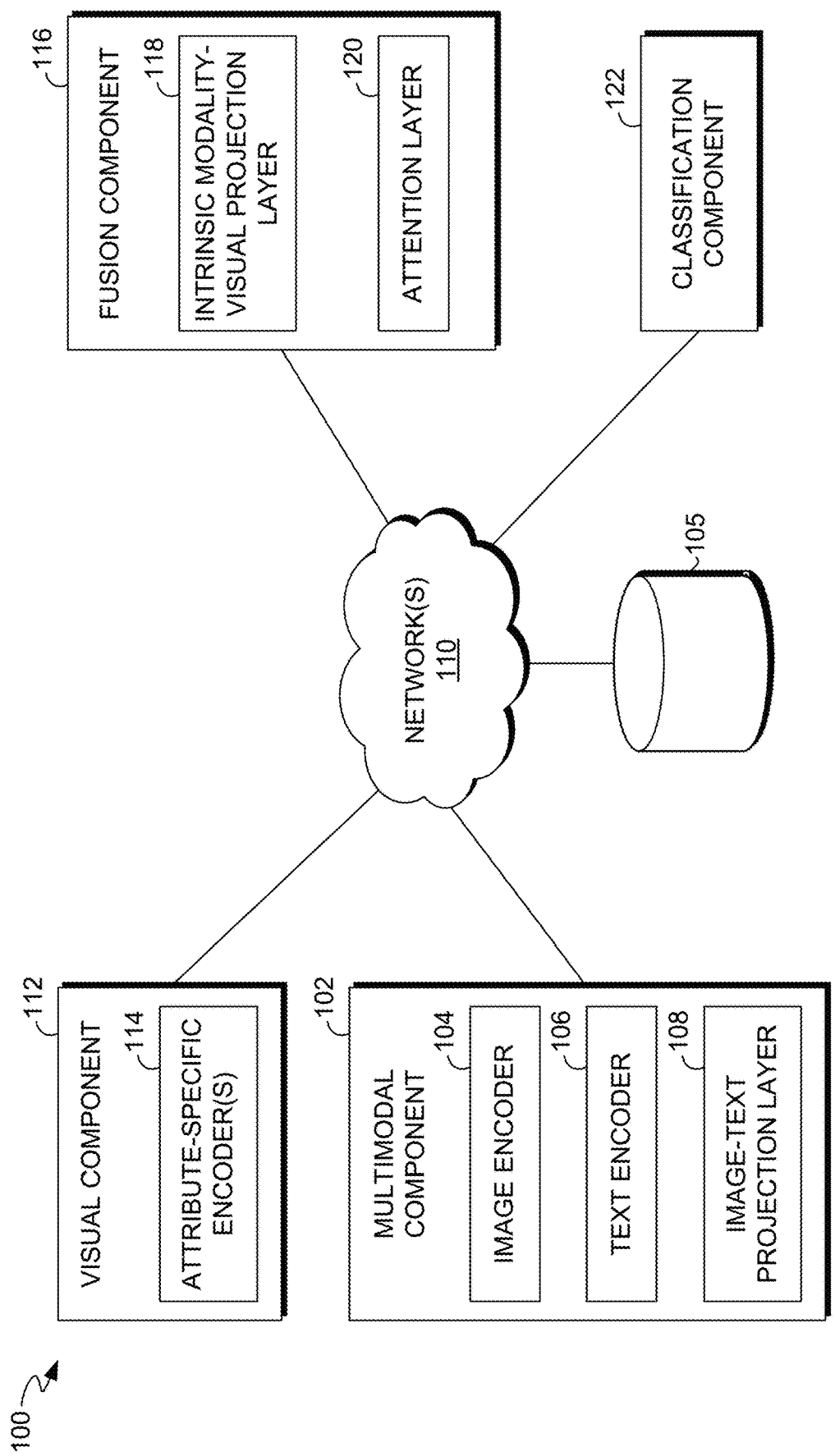
FIG. 1 is a block diagram illustrating an example computing system architecture suitable for implementing embodiments of the disclosure.

As described above, when the probability distributions of training data and testing data are different, the performance of ML models often deteriorates due to domain distribution gaps. In image processing, a "domain" refers to a particular category, manner, format, or style that content exists in (but not the object(s) that the content itself represents) and there are often multiple domains that models must account for regarding the same content category/class. For example, for content representing a dog object, a first domain may be a photographic image taken of a real world dog, a second domain may be a cartoon image of a dog, and a third domain may be an art painting of a dog. In this example, ML models should be able to classify the content as a dog, regardless of the domain that the dog is presented in. The ability of a ML model to classify or generalize across unseen domains (domains not trained on) is referred to as "domain generalization." Domain generalization deals with a challenging setting where one or several different but related domain(s) are given, and the goal is to learn a model that can generalize to an unseen test/deployment domain (referred to as "domain shift"). In other words, the model should be able to classify one or more portions of an image, regardless of the domain it is presented in. Existing image processing models are inaccurate or consume too many computer resources in generalizing or making predictions for domains they have not trained on (at test time) or domains they have not tested on (at deployment time).

Some existing computer vision technologies and models try to overcome the domain shift problem in image processing by augmenting a training data set with more images that account for more domains. However, this is expensive in terms of computer resource consumption. For example, each image itself consumes a large quantity of computer memory. In order train and learn from other domains at acceptable loss thresholds, these models would need to be supplemented with millions or more images and the corresponding models would have to possess several millions of parameters so the memory consumption costs exponentially multiply with these additional training data. In consequence of such data augmentation, other computer resources would likely be unnecessarily consumed as well, such as network latency, storage device I/O, and bandwidth. Image processing, for example, is expensive to process because each image contains a lot of pixel value data that is typically converted into a computer-readable format to be processed by a model. Accordingly, for a given application and network, there may be several bits dedicated to, for example, converting an image into a set of corresponding vectors in preparation for model processing, and performing actual model processing to classify images, especially with these augmented data sets. Accordingly, in the same network there are fewer bits available for a given time period to perform other tasks because of the heavy computational needs, thereby negatively impacting network bandwidth. Similarly, model processing on these augmented datasets causes excessive storage devices (e.g., disk) I/O. There are I/O costs (e.g., excess physical read/write head movements on non-volatile disk) because each time a model processes an image, the computing system has to reach out to the storage device to perform a read or write operation, which is time consuming, error prone, and can eventually wear on components, such as a read/write head. There are also efficiency costs with training these models. That is, these models take a vast quantity of time to train and deploy in a production environment. This is because most parameters are learned from scratch, taking many epochs and training sessions and these augmented training images would have to be labeled or annotated, which is tedious.

Most existing computer vision and image processing technologies that aim to tackle the domain shift problem use different learning paradigms and training strategies to learn domain-agnostic semantic features that represent an object/content category. Such solutions work based on the assumption that a domain-invariant manifold exists where the object images lie irrespective of the domain in which they are represented. For example, class-level semantic cues, such as long neck, long legs, or has spots, are stable characteristic features that define a giraffe class. However extracting such cues is a challenging problem when trying to describe or summarize image data using one-hot or soft-label vectors, thereby leading to inaccuracies. For example, a model might place a bounding box over a background object as part of detecting the legs of a foreground animal object based on one-hot encoded labels of the image, leading to an inaccurate determination of long legs.

Some existing computer vision technologies try to overcome such semantic feature extraction problem for domain shifts by using vision-language models (e.g., Contrastive Language-Image Pre-training, "CLIP") models. CLIP employs multimodal learning, which aims to build models that combine and process information from multiple modalities, like image and text annotations. CLIP proposes a simple pre-training task of predicting which natural language text annotation caption (i.e., the text modality) best describes an image (or feature of an image) through an image-text contrastive supervision. Such models map image features to text annotations that describe the image features, such "giraffe" with "long neck," "long legs," and "spots." Text annotations can describe images with syntactically and semantically meaningful sentences/phrases, which offers a more accurate way to summarize/describe image content than one-hot or soft-labeled vectors. Vision-language models like CLIP, which are trained on noisy weakly aligned image-text pairs with minimal supervision are more accurate at understanding/summarizing image content in different domains compared to other vision models.

However, these vision-language models require text annotations to be generated for every image of every domain, which would be computationally expensive and is not guaranteed to happen. Further, curating semantically dense text annotations for every image in a dataset can be a daunting task to build the actual model since this requires labor-intensive crowdsourcing pipelines (e.g., for manual labeling) and time, thereby hindering deployment. This makes the process tedious and infeasible, hindering the ability to use vision-language to achieve the best generalization on an unseen domain.

Various embodiments of the present disclosure provide one or more technical solutions to one or more of the technical problems described above. Particular embodiments are directed to classifying one or more portions of an image based on using an "intrinsic" modality (e.g., an un-normalized neural network embedding) that acts as a substitute to "text" modality in a multi-modal network, such as a vision-language model. Text modality is a preferred way to describe or classify an image because natural language text annotations should be consistent across all domains. However, explicit natural language textual annotations may not be available across one or more domains in a multi-modal network. Accordingly, various embodiments generate an intrinsic modality, which is also a description of one or more portions of an image, except that such description is not an explicit natural language description, but rather a machine learning model representation (e.g., an un-normalized embedded feature vector).

Some embodiments are additionally directed to leveraging a visual modality obtained from a vision-only model or branch (e.g., a vision transformer), which may learn from domains to enhance generalization to unseen domains. Some embodiments are additionally or alternatively directed to fusing or integrating the intrinsic modality with the visual modality obtained from a vision transformer, in order to generalize better on unseen domains.

Particular embodiments improve existing vision-language models, such as CLIP, via the use of an intrinsic modality, in terms of resource consumption. An "intrinsic modality" is neither natural language text in classic text modality contexts nor a visual modality, but in some embodiments, is rather a neural network-generated embedding or description that describes or correlates to one or more portions of an image. With respect to resource consumption, unlike existing CLIP models, textual annotations are not generated for every image of every domain. Rather, intrinsic descriptions or modalities are generated for at least some of the images. Accordingly, memory consumption, network bandwidth, deployment, testing and other costs exponentially do not blow up, as described above, but are conserved. Since the intrinsic modalities are neural network-generated, there is no requirement for labor-intensive crowdsourcing pipelines (e.g., for manual labeling) and time. This makes the process feasible at build and development time, thereby improving the ability to use vision-language to achieve the best generalization on an unseen domain.

Particular embodiments also improve classification accuracy and domain generalization relative to existing technologies via the use of intrinsic modality and by fusing the intrinsic modality with a visual branch that accounts for more domains than any base model. In other words, particular embodiments are able to train/make inferences on more domains and use more descriptions (some of them of which are intrinsic) relative to base models. As such, classification becomes more accurate across more domains. For example, fusing intrinsic modality with a visual modality helps a visual transformer exhibit more shape-bias relative to vanilla visual transformer or other technologies, as described herein.

Particular embodiments also improve existing computer vision models via the use of text annotations themselves. As described above, some technologies extract semantic cues when trying to describe or summarize image data using one-hot or soft-label vectors, thereby leading to inaccuracies. However, particular embodiments describe or summarize image data using text annotations instead. Text annotations can describe images with syntactically and semantically meaningful sentences/phrases, which offers a more accurate way to summarize/describe image content than one-hot or soft-labeled vectors. Accordingly, the use text annotations is one technical solution.

Various embodiments of the present disclosure improve computer resource consumption relative to existing computer vision technologies. Specifically, for example, particular embodiments exclude or refrain from augmenting a training data set with more images than necessary to overcome the domain shift problem. Accordingly, memory consumption is exponentially reduced instead of multiplied. Consequently, other computer resources are saved, such as network latency, storage device I/O, and bandwidth. Because there are fewer training images that are processed, there are more bits available for a given network and time period to perform other tasks because of the fewer computational needs, thereby increasing network bandwidth. Similarly, model processing without these augmented datasets causes reduced storage device I/O, which means that the process is less error prone, and does place as much wear and tear on components, such as a read/write head because the model does not have to analyze these additional augmented datasets.

Referring now to FIG. 1, a block diagram illustrating an example computing system architecture (referred to as the "system 100") suitable for implementing embodiments of the disclosure. The system 100 is generally responsible for classifying one or more portions of an input image. The system 100 includes a multimodal component 102, a visual component 112, a fusion component 116, a classification component 122, and storage 105, each of which is communicatively coupled via one or more networks 110. The network(s) 110 is any suitable network(s), such as a Local Area Network (LAN), a Wide Area Network (WAN), the internet, or a combination of these, and/or include wired, wireless, or fiber optic connections. In general, network(s) 110 represent any combination of connections (e.g., APIs or linkers) or protocols that will support communications between the components of the system 100. In some embodiments, the components of the system 100 are embodied as a set of compiled computer instructions or functions, program modules, computer software services, logic gates, or an arrangement of processes carried out on one or more computer systems.

The multimodal component 102 is generally responsible for predicting one or more explicit text annotations given one or more input images and one or more intrinsic descriptions given one or more input images. Typically, the most relevant text annotations are those text annotations that correctly describe, in natural language, one or more features of an input image. In an illustrative example, in some embodiments, the multimodal component 102 includes or represents a modified "Contrastive Language-Image Pre-Training" (CLIP) model, which is a neural network trained on a variety of image-text pairs to predict the most relevant text snippet and intrinsic description, given an image, without directly optimizing for the task, similar to the zero-shot capabilities of GPT-2 and 3. Accordingly, in some embodiments, the multimodal component 102 generates vectors that corresponds to an explicit natural language description (also referred to as a "text annotation") of one or more portions of an image. However, additionally, in some embodiments, the multimodal component 102 extracts one or more intrinsic descriptions (also referred herein as "intrinsic modality") for one or more portions of an image. In some embodiments, an "intrinsic description" as described herein refers to an un-normalized (e.g., raw) projected embedding that represents one or more features of an image without explicitly describing, in natural language, the image, as described in more detail below. For example, a first image represented in a first domain may contain a first orange and the multimodal component 102 may produce a textual annotation indicating that the first image contains an "orange." A second image represented in a second domain may also contain a second orange and the multimodal component 102 may produce an intrinsic modality via an un-normalized projected embedding [0.1, 2, 3.4, 5, 2, 4, 0.3], which likewise indicates that the second image contains an orange, as described in more detail below. In some embodiments, an intrinsic description is not a one-hot encoded representation (e.g., 1=watermelon and 0=no watermelon) or soft-label representation (e.g., 0.84 likelihood of watermelon), but is rather a neural-network generated feature vector or embedding, where each value (or set of values) describes one or more features of an input image. One-hot encoding converts categorical data into a 0 or 1.

The multimodal component 102 includes the image encoder 104, the text encoder 106, and the image-text projection layer 108. The image encoder 104 (e.g., a vision transformer (ViT)) is generally responsible for encoding or converting all visual data in an image into a machine-readable format, such as a sequence of bits or vectors. For example, in some embodiments, a ViT splits an image into visual tokens by dividing the image into fixed-size patches and then embeds each patch, which includes positional embedding as input to a transformer encoder.

The text encoder 106 is generally responsible for encoding or converting all text annotations into a machine-readable format and generating intrinsic descriptions for one or more image features, such as a sequence of bits or vectors. Such text annotations describes one or features of an image. For example, the text annotation of "breed A dog" is encoded as (0, 0.2, 0.8). In some embodiments, the text encoder 106 uses a start-of-sequence (SOS) and end-of-sequence (EOS) token signals used in NLP as feature representations of the text inputs. In most instances, these representations are layer normalized and linearly projected into the multi-modal embedding space.

As described above, in some embodiments, there are missing or null values for explicit text annotations of certain images processed by the image encoder 104. Accordingly, in situations where there is no direct access to text annotations, particular embodiments generate an intrinsic description by deriving an image's un-normalized projected embedding (e.g., a vector generated by the image encoder 104), which is weakly aligned with a hypothetical text annotation, as described in more detail below. This allows particular embodiments to leverage intrinsic modality present in a pre-trained multimodal vision transformer.

The image-text projection layer 108 is generally responsible for taking, as inputs, the vectors or encoded data of the image encoder 104 and the text encoder 106, and then projecting, in vector space, the vectors and pushing the vectors of matched image-text pairs together (e.g., via a contrastive objective) in the vector space and non-matched pairs apart in the vector space. For example, in some embodiments, the image-projection layer 108 simultaneously maximizes cosine similarity between matched pairs and minimize cosine similarity between non-matched pairs across all text-image pairs. One way to measure how well a model is functioning is detecting how close, in distance, the embedded representation (or vector) for each text annotation (produced by the text encoder 106) is relative to its corresponding embedded representation (or vector) for each corresponding image (produced by the image encoder 104). In an illustrative example, for a score representing 100% classification accuracy, a vector representing the text annotation "Jasper the dog" is within a threshold distance (identical) to a vector for the corresponding set of pixels of an image that represent Jasper the dog. Such vectors within the threshold distance are considered "matched" image-text pairs because they identically represent the same feature (e.g., a dog) even though they both describe the same feature differently—one in natural language via a text annotation or an intrinsic description and another via the pixel data represented in the image.

The visual component 112 is generally responsible for learning visual patterns or embeddings for a same object (e.g., a dog, a car, or cat) across different source domains. For example, for a particular lion object, the visual component 112 learns that across a sketch of the lion, a photograph of a lion, and a painting of a lion, the consistently represented features across all the domains are a mane around the face and four legs, but other features are not as consistently represented, such as the eye shape, color of the lion, the length of the lion, or other facial features, such as teeth and mouth. Accordingly, for example, particular embodiments activate nodes of a neural network representing mane and four-leg features, thereby weighting these features higher, while deactivating/inhibiting nodes of the neural network representing other features (e.g., eyes, teeth, color, etc.), thereby weighting these features lower. This means that for every image, where a mane around the face and four legs are detected, there is a higher probability that the object is a lion regardless of domain and regardless of the other features detected, such as nose shape, eye shape, and the like. However, in some embodiments, a model (e.g., a CLIP model) is not initialized with pre-trained weights both on the image encoder and the text encoding.

The visual component 112 includes the attribute-specific encoder 114. The attribute-specific encoder 114 is generally responsible for encoding content of an image of a particular attribute (e.g., domain, class, or dataset) into a vector or other machine-readable format, which represents the content of the image. In some embodiments, the visual component 112 includes multiple attribute-specific encoders 114 to encode visual data of multiple types of attributes. For example, a first encoder may be used only for encoding a first domain, whereas a second encoder may be used only for encoding a second domain.

In some embodiments, the attribute-specific encoder 114 includes or represents one or more ViTs or other vision encoders. As described in more detail below, in some embodiments, the patterns learned by visual component 112, when combined with the intrinsic modality can help boost the overall performance for a given task. Models, such as CLIP, typically do not train on data across all domains. Accordingly, the visual component 112 learns on a different dataset that CLIP or other models are not trained on. Accordingly, whatever domain shortcomings the multimodal component 102 has, the visual component 112 is used to make up for those shortcomings in many instances.

The fusion component 116 is generally responsible for fusing, integrating, or combining the intrinsic modality derived by the multimodal component 102 and the visual modality (learned visual embeddings or patterns, such as learned weights) derived by the visual component 112. In some embodiments, the fusion component 116 combines the best of both outputs produced by the multimodal component 102 and the visual component 112 by using multi-headed self-attention to detect what is missing in the multimodal component 102 (e.g., particular domains) and visual component 112 (e.g., particular domains) and then combines them to achieve a single representation or embedding, as described in more detail below.

The fusion component 116 includes the intrinsic modality and —visual modality projection layer 118 and the attention layer 120. The intrinsic/visual-modality projection layer 118 is generally responsible for projecting both the intrinsic modality and visual modality to the same vector space via one or more linear projections, as described in more detail below. Formally, a projection PP is a linear function on a vector space, such that when it is applied to itself you get the same result i.e. P2=PP=P. Consider a vector vv in two-dimensions. vv is a finite straight line pointing in a given direction. Suppose there is some point xx not on this straight line but in the same two-dimensional space. The projection of xx, i.e. PxPx, is a function that returns the point "closest" to xx along the vector line vv. Call this point ⁻xx⁻. In some embodiments, closest refers to Euclidean distance, i.e. $\sqrt{\Sigma}$i (xi−⁻xi)2,Σi(xi−⁻ⁱ)2, where ii ranges over the dimensions of the vector space (in this case two dimensions)

The attention layer 120 is generally responsible for performing inter-modality attention for intrinsic modality and visual modality. Such attention allows the intrinsic modality to attend with visual modality and incorporate any dataset, domain, or class-specific concepts present in the visual modality. In some embodiments, the attention layer 120 includes a multi-head attention layer, which is generally responsible for focusing or processing certain parts of the feature vectors representing specific portions of the intrinsic modality and the visual modality by generating attention vectors. For example, the multi-head attention layer determines how relevant the $i^{th}$ feature is for classifying a particular image (or portion of an image) across all domains, the output of which is an attention vector. For every feature (e.g., tail, eyes, nose, etc.), some embodiments generate an attention vector, which captures contextual relationships between other features in the same image. For a given feature, some embodiments compute a weighted average or otherwise aggregate attention vectors of other images that contain the same feature to compute a final attention vector.

The attention layer 120 is based on a trainable associative memory with (key, value) vector pairs. A query vector $q \in \mathbb{R}^d$ is matched against a set of k key vectors (packed together into a matrix $K \in \mathbb{R}^{k \times d}$) using inner products. These inner products are then scaled and normalized with a softmax function to obtain k weights. The output of the attention is the weighted sum of a set of k value vectors (packed into $V \in \mathbb{R}^{k \times d}$). For a sequence of N query vectors (packed into $Q \in \mathbb{R}^{N \times d}$) it produces an output matrix (of size N×d):

$$\text{Attention}(Q,K,V) = \text{Softmax}(QK^T/\sqrt{d})V$$

where the Softmax function is applied over each row of the input matrix and the $\sqrt{d}$ term provides appropriate normalization. Query, key and values matrices are themselves computed from a sequence of N input vectors (packed into $X \in \mathbb{R}^{N \times D}$): $Q = XW_Q, K = XW_K, V = XW_V$, using linear transformations $W_Q, W_K, W_V$ with the constraint k=N, meaning that the attention is in between all the input vectors. Finally, Multi-head self-attention layer (MSA) is defined by considering h attention "heads", i.e. h self-attention functions applied to the input. Each head provides a sequence of size N×d. These h sequences are rearranged into a N×dh sequence that is reprojected by a linear layer into N×D.

In some embodiments, a single headed attention has abstract vectors Q, K, and V that extract different components of a particular image feature or image. These are used to compute the attention vectors for every image feature or image, using the following formula:

$$Z = \text{softmax}\left(\frac{Q \cdot K^T}{\sqrt{\text{Dimension of vector } Q, K \text{ or } V}}\right) \cdot V$$

For multi-headed attention, in some embodiments there a multiple weight matrices $W^q$, $W^k$ and $W^v$ so there are multiple attention vectors Z for every image feature or image. However, a neural network may only expect one attention vector per image feature. Accordingly, another weighted matrix, $W^z$, is used to make sure the output is still an attention vector. In some embodiments, after the layers 506-1 and 506-2, there is some form of normalization (for example, batch normalization and/or layer normalization) performed to smoothen out the loss surface making it easier to optimize while using larger learning rates.

In some embodiments that are multiple layers that represent residual connection and/or normalization layers where normalization re-centers and re-scales or normalizes the data across the feature dimensions. One layer may be a feed forward layer that is a feed forward neural network that is applied to every one of the attention vectors outputted by the multi-head attention layer. The feed forward layer transforms the attention vectors into a form that can be processed by the next encoder block or making a prediction.

The classification component 122 is generally responsible for classifying one or more portions of an image or otherwise generating a score indicating that the one or more portions correspond to a particular object (e.g., a lion) via a particular confidence level based on the outputs produced by the fusion component 116, as described in more detail below.

Figure 2A:
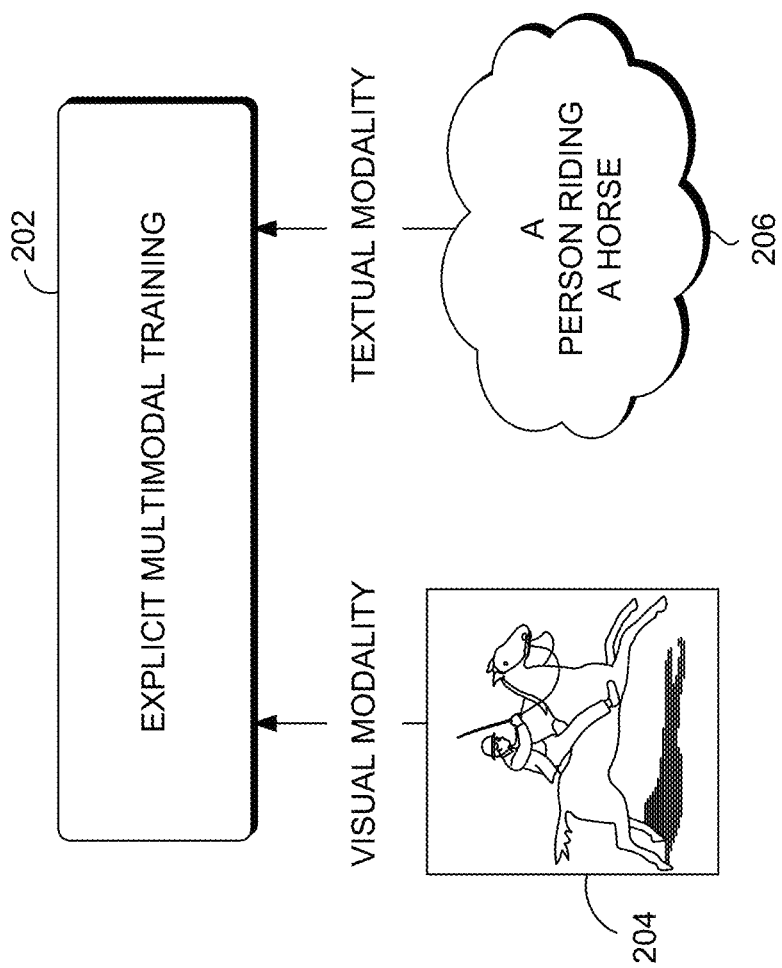
FIG. 2A is a schematic diagram illustrating how explicit text annotations are generated, according to some embodiments.

FIG. 2A is a schematic diagram illustrating how explicit text annotations are used, according to some embodiments. In some embodiments, FIG. 2A represents CLIP model functionality, where the visual modality 204 is produced, along with a corresponding text annotation (i.e., textual modality) 206, this pair of which has been learned via the explicit multimodal training 202. In some embodiments, multimodal training 202 includes contrastive pre-training, which involves training an image encoder and a text encoder in the multi-modal embedding vector space to predict the correct pairings of a batch of (image, text) training examples, where an image is the payload data and the text is the label or annotation. For example, an annotator may label an image of a monkey holding a ball as "monkey holding a ball."

In the multi-modal embedding vector space, in some embodiments, the image encoder and text encoder are jointly trained to maximize the cosine similarity of the image and text embeddings of the image-text pairs in the batch. On the flip side, the cosine similarity of the embeddings with incorrect pairings are also minimized. For example, in a batch size of N (image, text) pairs, the model predicts which of the N×N possible (image, text) pairings across a batch are similar and incorrect pairs. This means that correct pairs have a cosine similarity value closer to 1, while incorrect pairs had a value closer to 0. For example, visual modality 204 and the text annotation 206 is considered to be a correct pair (value closer to 1), whereas, for example, the visual modality 204 and a text annotation reading "a person throwing a ball" is considered an incorrect pair (value closer to 0), since the visual modality 204 indicates a person riding a horse (and not throwing a ball).

Figure 2B:
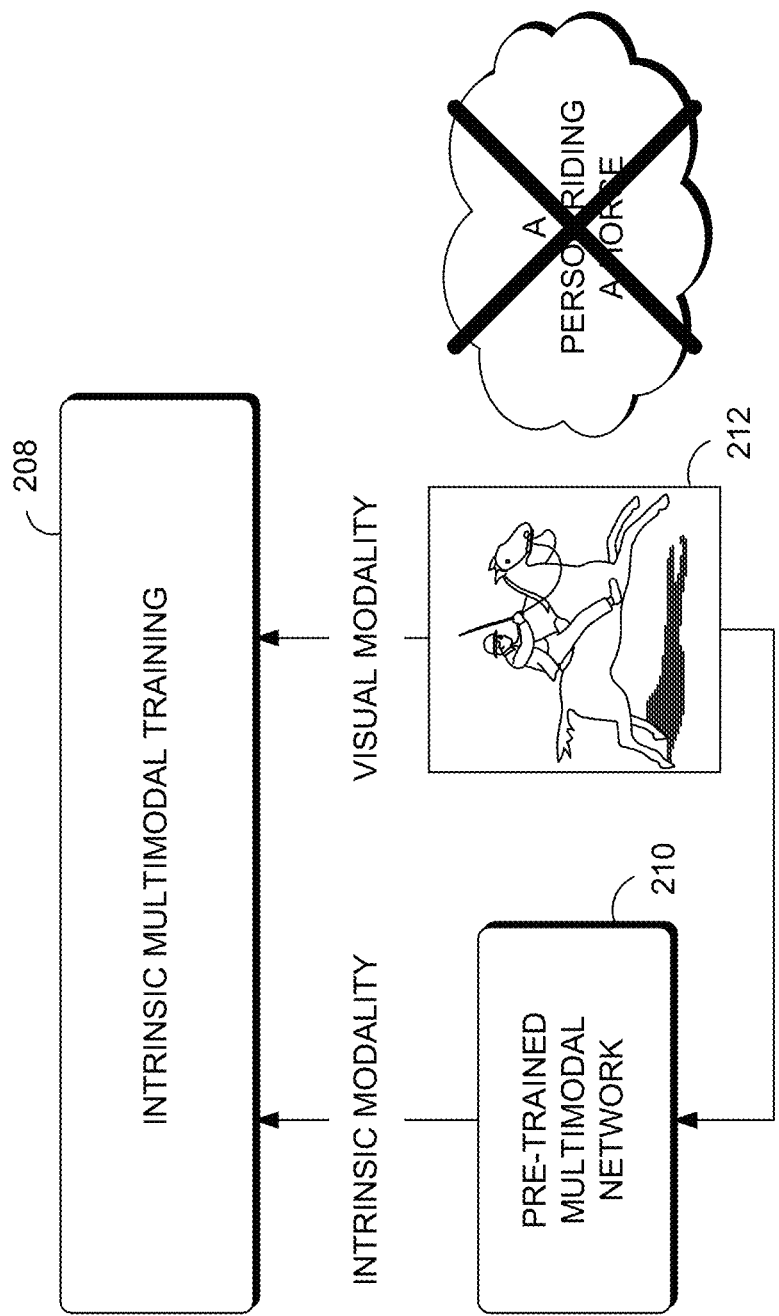
FIG. 2B is a schematic diagram illustrating how intrinsic modality is extracted absent text annotation, according to some embodiments.

FIG. 2B is a schematic diagram illustrating how intrinsic modality is extracted in absence text annotation, according to some embodiments. In many instances, such as with typical CLIP models, the models do not have access to explicit text annotations for given visual modalities. For example, for visual modality or image 212, there is no corresponding text annotation. Accordingly, various embodiments of the present disclosure generate an intrinsic modality 210, which, in some embodiments, is a neural network feature representation (e.g., an embedding or vector). For example, some embodiments project the image 212 to a linear layer to obtain the embedding, which is used as the intrinsic modality. In order to obtain the correct image-intrinsic modality pair, particular embodiments train on various image-intrinsic modality pairs via the intrinsic multimodal training 208. In some embodiments, the intrinsic multimodal training 208 includes a modified type of contrastive pre-training, which involves training an image encoder and a text encoder in the multi-modal embedding vector space to predict the correct pairings of image-intrinsic modality training examples. For example, instead of an annotator annotating an image of a monkey throwing a ball with a natural language caption ("monkey throwing ball"), an annotator or program may annotate the image with its intrinsic modality embedding (e.g., [2, 5.6, 3.4]), which identically represents a monkey throwing a ball. In this manner, a particular intrinsic modality embedding sequence can be learned for particular images where text annotations are not present.

In the multi-modal embedding vector space, in some embodiments, the image encoder and text encoder are jointly trained to maximize the cosine similarity of the image and intrinsic modality embeddings of the image-intrinsic modality pairs in the batch. On the flip side, the cosine similarity of the embeddings with incorrect pairings are also minimized.

Figure 3:
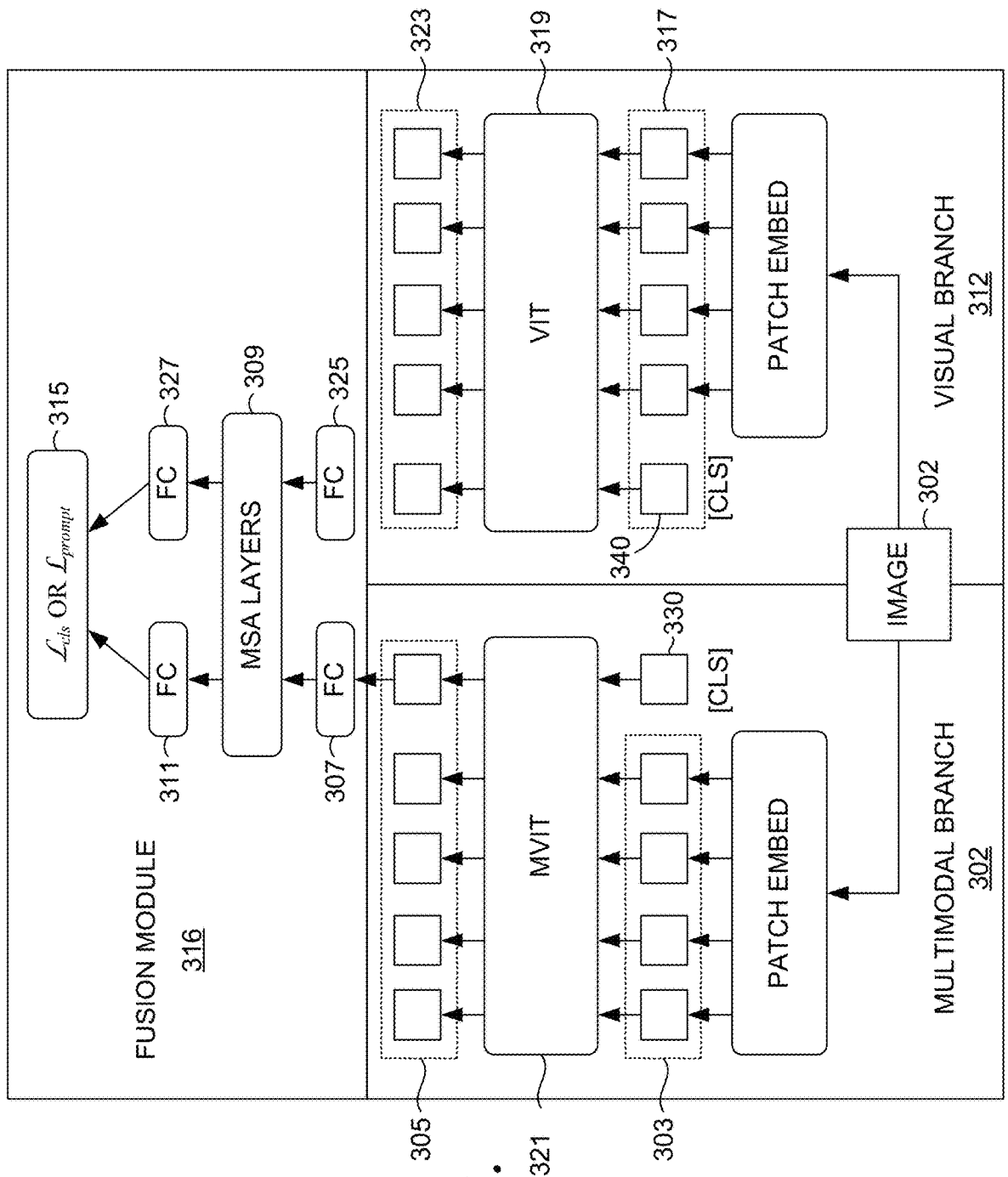
FIG. 3 is a block diagram illustrating example architecture for classifying one or more portions of an input image, according to some embodiments.

FIG. 3 is a block diagram illustrating example architecture for classifying one or more portions of an input image, according to some embodiments. In some embodiments, the fusion module 316 represents the fusion component 116 of FIG. 1. Likewise, in some embodiments, the multimodal branch 302 represents the multimodal component 102 of FIG. 1 and the visual branch 312 represents the visual component 112 of FIG. 1.

The goal of Domain Generalization (DG) is to learn a model using data from source domains such that it generalizes to an unseen target domain. Let $S^{Tr}=\{(x, y, d_s) | x \in \mathcal{X}, y \in \mathcal{Y}, d_s \in D^s\}$ denote the training set, where x is an image (e.g., 302) in the visual space ($\mathcal{X}$) with corresponding class label y from a set of known class labels Y and domain label $d_s$, from a set of source domains $D^s$. The test set is denoted by $S^{Ts}=\{(x, y, d_u) | x \in \mathcal{X}, y \in \mathcal{Y}, d_u \notin D^s\}$ where $d_u$ represents the unseen target domain. Particular embodiments aim to learn a model that captures the mapping from $\mathcal{X} \rightarrow \mathcal{Y}$ such that it is trained using $S^{Tr}STr$, but can predict class label $y \in \mathcal{Y}$ for an $x \in \mathcal{X}$ sampled from an unseen domain $d_u \notin D^S$ in $S^{Ts}$.

A Vision Transformer (ViT), such as Multimodal Vision Transformer 321 (MViT) and the ViT 319 (e.g., the image encoder 104 of FIG. 1) are composed of a sequence of blocks where each block contains multi-headed self-attention (MSA) with a feedforward network (FFN) and layer normalization (LN). An input image, x, (i.e., 302) is first converted into a sequence of patch tokens 303 and 317, $x_{patch}$ by dividing it with a specific patch size followed by a linear projection. Next, an additional classification (CLS) token 330 and 340, $x_{CLS}$, is added to the sequence, followed by adding positional embedding $x_{pos}$, to each token to provide positional information (e.g., where, in coordinate space of an image, is a particular set of pixels representing a portion of a feature). All tokens 303 and 317 are then passed through stacked transformer blocks at 321 and 319. The CLS token 330 and 340 interacts with all patch tokens and the MViT 321 and ViT 319 summarizes them in single embedding vectors 305 and 323 for final classification. In some embodiments, the processing for kth transformer block summarized as:

$$x_0 = [x_{CLS} \| x_{patch}] + x_{pos} \quad (1)$$

$$o_k = x_{k-1} + MSA(LN(x_{k-1}))$$

$$x_k = o_k + FFN(LN(o_k))$$

As depicted in FIG. 3, there are three main components: (1) a multimodal branch 302, which includes a multimodal vision transformer (MViT) 321 pre-trained on image-text pairs used to extract the intrinsic modality present in it; (2) a visual branch 312, which trains a vision transformer (ViT) 319 to extract visual modality that will encode meaningful shape-biased concepts from the source domains, useful for generalization; and (3) a fusion module 316, which combines best of both—intrinsic and visual modality through a multi-headed self-attention mechanism for final classification.

With respect to the Multimodal branch 302, particular embodiments leverage pre-trained large-scale vision-language networks (e.g., CLIP, DeCLIP, ALBEF, etc.) that use a contrastive objective to push the embeddings of matched image-text pairs together and non-matched pairs apart. In some embodiments, the pipeline includes an image encoder $f^M(.)$ (in FIG. 3 a ViT which is MViT 321), a text encoder g(.), and linear projection layers $h^I(.)$ and $h^T(.)$. In some embodiments, the image and text features (obtained from their respective encoders 321 and 319) are projected to the same dimension, normalized, and then aligned using the following contrastive loss:

$$z_i^I = \frac{h_I(f_{CLS}^M(x_i))}{\|h_I(f_{CLS}^M(x_i))\|_2}; z_i^T = \frac{h_T(g(t_i))}{\|h_T(g(t_i))\|_2}$$

$$L_I = -\frac{1}{N}\sum_{i=1}^{N}\log\frac{\exp(sim(z_i^I, z_i^T)/\mathcal{T})}{\sum_{j=1}^{N}\exp(sim(z_i^I, z_j^T)/\mathcal{T})}$$

$$L_T = -\frac{1}{N}\sum_{i=1}^{N}\log\frac{\exp(sim(z_i^T, z_i^I)/\mathcal{T})}{\sum_{j=1}^{N}\exp(sim(z_i^T, z_j^I)/\mathcal{T})}$$

$$L_{contrastive} = (L_I + L_T)/2$$

here ($x_i$, $t_i$) denote the ith image-text pair in a batch of size N. $f_{CLS}^M(.)$ represents the MViT's 321 representation corresponding to the CLS token 330. In some embodiments, the similarity function sim(,) is measured by dot product, and $\mathcal{T}$ is a learnable temperature variable to scale the logits.

In scenarios where there is no direct access to text annotations, particular embodiments assume that an image's un-normalized projected embedding $h^I(f_{CLS}^M(x_i))$ would be weakly aligned with its hypothetical text annotation. This allows particular embodiments to leverage the intrinsic modality present in a pre-trained multimodal vision transformer 321. Hence, particular embodiments use this un-normalized projected embedding $h^I(f_{CLS}^M(x_i))$ as an "intrinsic" modality in the overall pipeline, as described herein.

With respect to the Visual branch 312, it is a sibling to the multimodal branch 302. Particular embodiments employ a trainable vision transformer, $f^V(.)$ (i.e., 319 in FIG. 3), to learn visual concepts from source domains that might be absent in MViT 321 representations but are relevant to the task. In some embodiments, these concepts are dataset-, domain-, or even class-specific, which, when combined with the "intrinsic" modality, can help boost the overall performance on the given task. Moreover, by design, since ViTs are better than CNNs in recognizing object shapes, their shape-biased representations $f_{CLS}^V(x)$ will further assist the overall pipeline in generalizing to unseen domains.

The purpose of the fusion module 316 is to fuse the "intrinsic" modality $h^I(f_{CLS}^M(x))$ (obtained from the multimodal branch 302) and the visual modality $f_{CLS}^V(x)$ (obtained from the visual branch 312) to perform the final classification. Particular embodiments first project both of them to same space via linear projections $w^M(.)$ and $w^V(.)$ to obtain intrinsic modality $w^M(h^I(f_{CLS}^M(x)))$ token (i.e., FC 307 in FIG. 3) and visual modality $w^V(f_{CLS}{}^V(x))$ token (i.e., FC 325 in FIG. 3). This is followed by a series of K multi-headed self-attention blocks (MSA) 309 and feed-forward networks (FFN) to perform inter-modality attention on both tokens 307 and 325 as follows:

$$x_0^M = w^M(h^I(f_{CLS}^M(x))); \quad x_0^V = w^V(f_{CLS}^V(x))$$

$$\mathbf{X}_0 = [\mathbf{x}_0^M \| \mathbf{x}_0^V]$$

$$o_k = x_{k-1} + MSA(LN(x_{k-1}))$$

$$x_k = o_k + FFN(LN(o_k))$$

$$\mathbf{X}_K = [\mathbf{x}_K^M \| \mathbf{x}_K^V]$$

The attention mechanism allows the intrinsic modality token 307 to attend with the visual modality token 325 and incorporate any dataset, domain, or class-specific concepts present in it. Similarly, the visual modality token 325 will interact with the intrinsic modality token 307 to learn multimodal concepts present in it. This ensures that final representations leverage the best of both modalities. Finally, the transformed representation of intrinsic modality ($x_K^M$) (i.e., 311 of FIG. 3) is passed through a linear layer $c^M(.)$ (i.e., 315 of FIG. 3) to get class predictions and minimize cross-entropy loss. In addition to this, particular embodiments add a regularizer that also minimizes classification loss on the transformed representation of visual modality token (i.e., 327 of FIG. 3) (by passing $x_K^V$ through another linear layer $c^V(.)$). Overall, in some embodiments, loss is written as follows:

$$\hat{y}_M = c^M(x_K^M); \quad \hat{y}_V = c^V(x_K^V) \quad (3)$$

$$L_{cls} = \lambda \cdot L_{CE}(\hat{y}_M, y) + (1-\lambda) \cdot L_{CE}(\hat{y}_V, y)$$

where $\lambda$ is the regularization hyperparameter. In scenarios like OpenDG, where each source domain holds disparate label sets, chances of learned representations becoming domain biased are high. Rather than minimizing Equation 3, particular embodiments minimize the following semantic alignment loss $$z^M = \frac{p^M(x_K^M)}{\|p^M(x_K^M)\|_2}; \quad z^V = \frac{p^V(x_K^V)}{\|p^V(x_K^V)\|_2} \quad (4)$$

$$\hat{y}_M = \left[ \frac{\exp(\text{sim}(z^M, g(t_1))/\mathcal{T})}{\sum_i^C \exp(\text{sim}(z^M, g(t_i))/\mathcal{T})}, \ldots \frac{\exp(\text{sim}(z^M, g(t_C))/\mathcal{T})}{\sum_i^C \exp(\text{sim}(z^M, g(t_i))/\mathcal{T})} \right]$$

$$\hat{y}_V = \left[ \frac{\exp(\text{sim}(z^V, g(t_1))/\mathcal{T})}{\sum_i^C \exp(\text{sim}(z^V, g(t_i))/\mathcal{T})}, \ldots \frac{\exp(\text{sim}(z^V, g(t_C))/\mathcal{T})}{\sum_i^c \exp(\text{sim}(z^V, g(t_i))/\mathcal{T})} \right]$$

$$L_{prompt} = \lambda \cdot L_{CE}(\hat{y}_M, y) + (1-\lambda) \cdot L_{CE}(\hat{y}v, y)$$

where $p^M(.)$ and $p^V(.)$ are semantic projection layers, $\mathcal{T}$ is a learnable temperature variable to scale the logits, $t_i$ is the text prompt for ith class—e.g., "a photo of { class}", and $g(.)$ is the text encoder of the pre-trained multimodal network. Enforcing that images align with their corresponding class prompts ensures that the representations do not get biased towards domains and capture domain-agnostic class-specific semantics described via class prompts.

Figure 4:
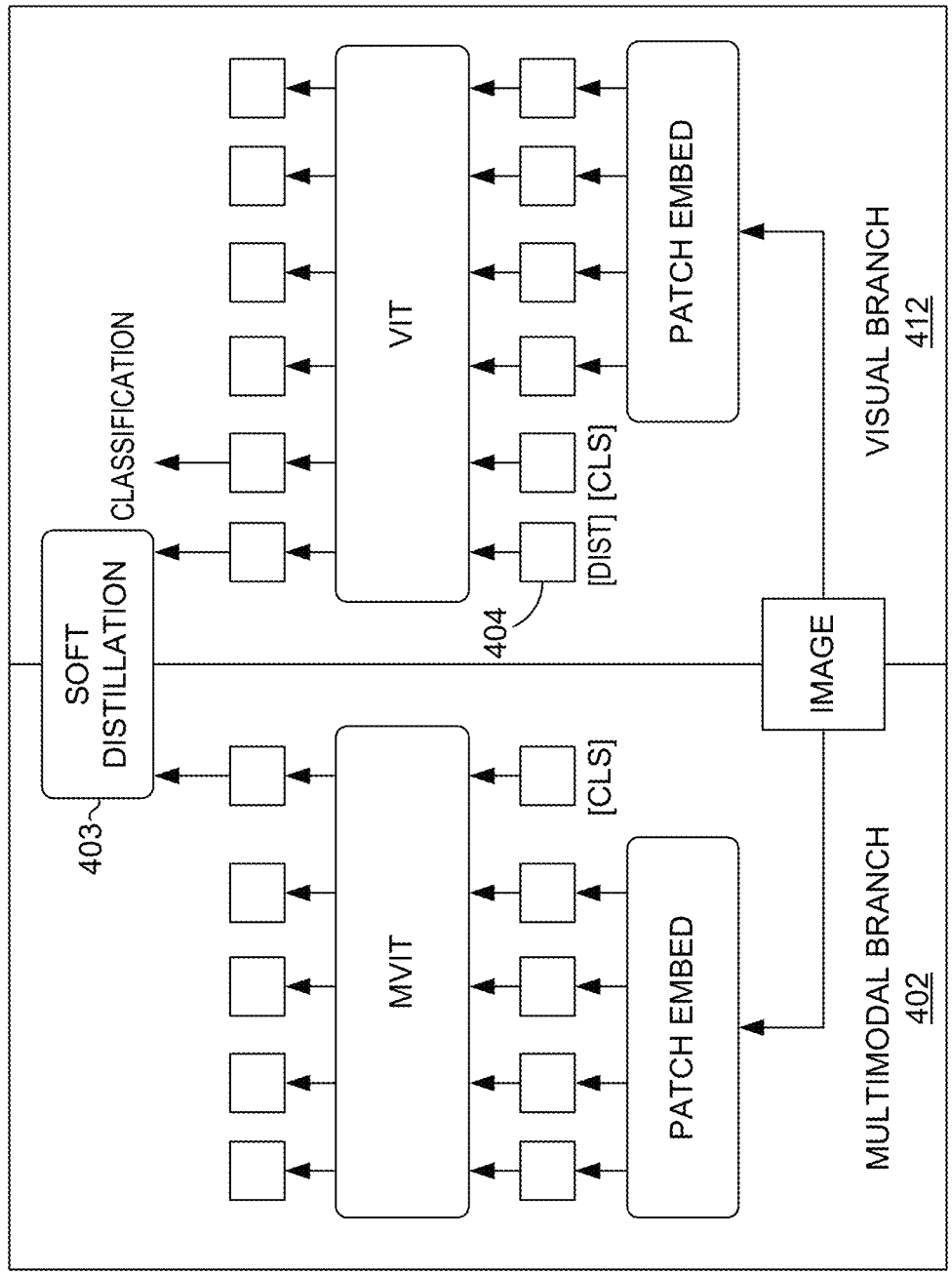
FIG. 4 is a block diagram illustrating example architecture for classifying one or more portions of an input image, according to some embodiments.

FIG. 4 is a block diagram illustrating example architecture for classifying one or more portions of an input image, according to some embodiments. In some embodiments, the multimodal branch 402 includes the functionality as described with respect to the multimodal branch 302 of FIG. 3 or the multimodal component 102 of FIG. 1. Likewise, in some embodiments, the visual branch 412 includes identical functionality as described with respect to the visual branch 312 of FIG. 3 or the visual component 112 of FIG. 1

There are alternative ways to leverage the intrinsic modality obtained from a multimodal branch and combine it with the visual modality extracted from the visual branch, as for example, laid out in FIG. 3. One way to combine intrinsic modality with the visual modality is to use logit distillation 403. Distillation 403 considers MViT as a teacher and distils a ViT with a soft distillation loss via a DIST token 404. Accordingly, particular embodiments consider the pre-trained MViT as a teacher network and use a soft-distillation strategy to distill intrinsic modality present in it via an additional distillation (DIST) token.

Soft distillation minimizes the Kullback-Leibler divergence between the softmax of the teacher and the softmax of the student model. Let $Z_t$ be the logits of the teacher model, ($Z_s$) the logits of the student model. Particular embodiments denote by $\tau$ the temperature for the distillation, $\lambda$ the coefficient balancing the Kullback-Leibler divergence loss (KL) and the cross-entropy ($\mathcal{L}_{CE}$) on ground truth labels y, and $\psi$ the softmax function. The distillation objective is $$\mathcal{L}_{global} = (1-\lambda) \mathcal{L}_{CE}(\psi(Z_s), y) + \lambda \tau^2 KL(\psi, Z_s/\tau), \psi(Z_t/\tau)).$$

Figure 5:
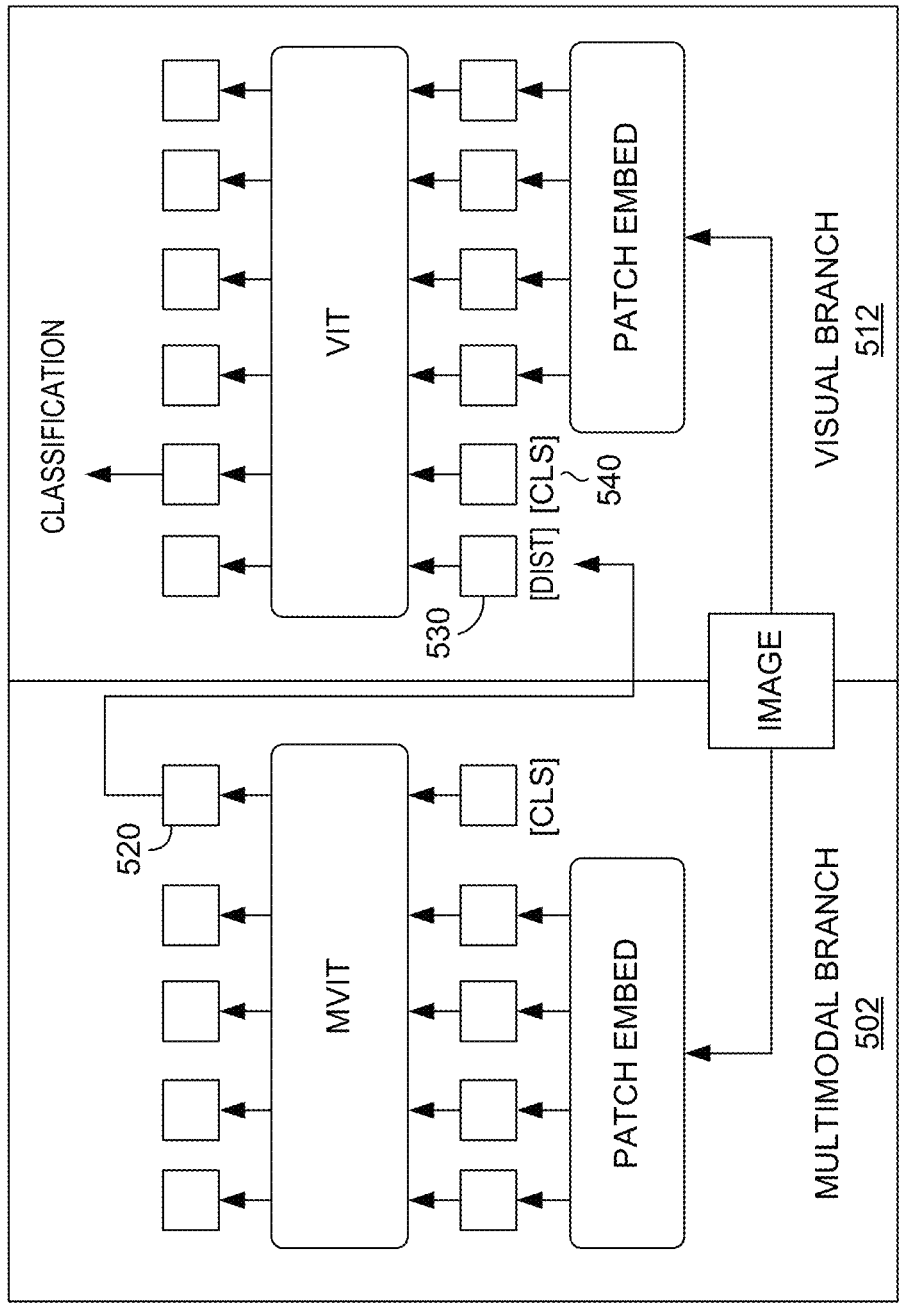
FIG. 5 is a block diagram illustrating example architecture for classifying one or more portions of an input image, according to some embodiments.

FIG. 5 is a block diagram illustrating example architecture for classifying one or more portions of an input image, according to some embodiments. In some embodiments, the multimodal branch 502 includes the functionality as described with respect to the multimodal branch 302 of FIG. 3 or the multimodal component 102 of FIG. 1. Likewise, in some embodiments, the visual branch 512 includes identical functionality as described with respect to the visual branch 312 of FIG. 3 or the visual component 112 of FIG. 1

One way to combine intrinsic modality with the visual modality is to perform early fusion, which fuses the intrinsic modality via the DIST token 530 in the input layer of the visual branch 512 itself. Instead of using DIST token 530 for performing logit distillation as illustrated in FIG. 4, particular embodiments use it to fuse the intrinsic modality in the input layer of the visual branch 512 itself. The CLS token $x_{CLS}$ (i.e., 540 in FIG. 5) can now interact with both—intrinsic modality (provided via DIST token 530) and patch tokens $x_{patch}$ (i.e., 520 in FIG. 5) to summarize the information present in them for final classification.

Figure 6:
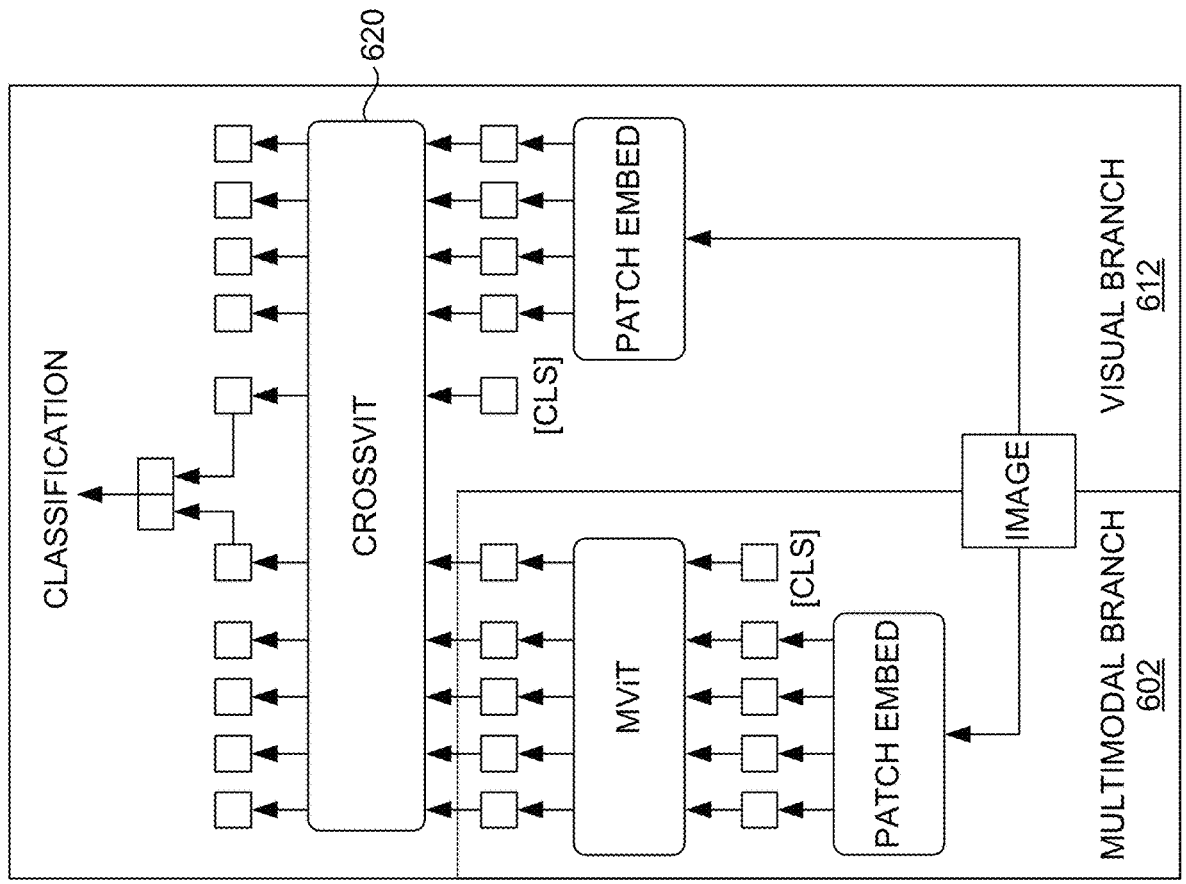
FIG. 6 is a block diagram illustrating example architecture for classifying one or more portions of an input image, according to some embodiments.

FIG. 6 is a block diagram illustrating example architecture for classifying one or more portions of an input image, according to some embodiments. In some embodiments, the multimodal branch 602 includes the functionality as described with respect to the multimodal branch 302 of FIG. 3 or the multimodal component 102 of FIG. 1. Likewise, in some embodiments, the visual branch 612 includes the functionality as described with respect to the visual branch 312 of FIG. 3 or the visual component 112 of FIG. 1.

One way to combine intrinsic modality with the visual modality is to use a Cross ViT 620 to cross-attend MViT features with ViT features. Particular embodiments thus cross-attend features (corresponding to image patches and CLS token) extracted from vision-language model (e.g., CLIP) with image patch embeddings $x_{patch}$ and CLS token $x_{CLS}$. For this purpose, particular embodiments employ a Cross attention Vision Transformer (CrossViT) 620 rather than vanilla ViT in the visual branch 612.

In some embodiments, classification at FIG. 6 involves the CLS token of one branch and patch tokens of the other branch. Specifically, in order to fuse multi-scale features more efficiently and effectively, some embodiments first utilize the CLS token at each branch as an agent to exchange information among the patch tokens from the other branch and then back project it to its own branch. Since the CLS token already learns abstract information among all patch tokens in its own branch, interacting with the patch tokens at the other branch helps to include information at a different scale.

After the fusion with other branch tokens, the CLS token interacts with its own patch tokens again at the next transformer encoder, where it is able to pass the learned information from the other branch to its own patch tokens, to enrich the representation of each patch token. In the following, the cross-attention module for the large branch (L-branch) (e.g. MViT) is described, and the same procedure is performed for the small branch (S-branch) (e.g., ViT) by simply swapping the index l and s.

Specifically, for branch l, it first collects the patch tokens from the S-Branch and concatenates its own CLS tokens to them, as shown in the equation below. The CLS token of the large branch (circle) serves as a query token to interact with the patch tokens from the small branch through attention. PO and g10 are projections to align dimensions. The small branch follows the same procedure but swaps CLS and patch tokens from another branch.

$$x'^l = [f^l(x_{cls}^l) \| x_{patch}^s],$$

where $f^l(\bullet)$ is the projection function for dimension alignment. The module then performs cross-attention (CA) between $x_{cls}^l$ and $x'^l$, where CLS token is the only query as the information of patch tokens are fused into CLS token. Mathematically, the CA can be expressed as $$q = x'^l_{cls} W_q, k = x'^l W_k, v = x'^l W_v,$$

$$A = \text{softmax}(qk^T)/\sqrt{(C/h)}, CA(x'^l) = A_v)$$

where $W_q, W_k, W_v \in \mathbb{R}^{C \times (C/h)}$ are learnable parameters, C and h are the embedding dimension and number of heads. Note that since some embodiments only use CLS in the query, the computation and memory complexity of generating the attention map (A) in cross-attention are linear rather than quadratic as in all-attention, making the entire process more efficient. Moreover, as in self-attention, some embodiments also use multiple heads in the CA and represent it as (MCA). However, these embodiments do not apply a feed-forward network FFN after the cross-attention. Specifically, the output $z^l$ of a cross-attention module of a given $x^l$ with layer normalization and residual shortcut is defined as follows.

$$y_{cls}^l = f^l(x_{cls}^l) + MCA(LN([f^l(x_{cls}^l) \| x_{patch}^s]))$$

$$z^l = [g^l(y_{cls}^l) \| x_{patch}^l],$$

where $f^l(\bullet)$ and $g^l(\bullet)$ are the projection and back-projection function for dimension alignment, respectively. Cross-attention achieves the best accuracy compared to other three simple heuristic approaches while being efficient for multi-scale feature fusion.

Exemplary Flow Diagrams

Figure 7:
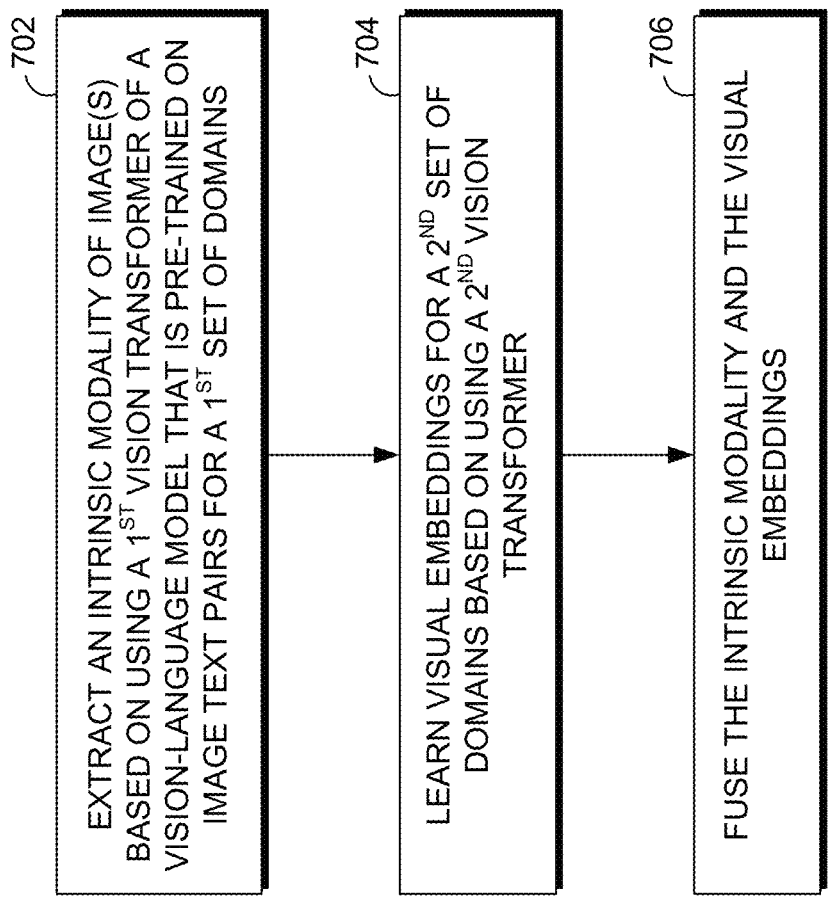
FIG. 7 is a flow diagram of an example process for fusing an intrinsic modality and visual modality, according to some embodiments.

FIG. 7 is a flow diagram of an example process 700 for fusing an intrinsic modality and visual modality, according to some embodiments. The process 700 (and/or any of the functionality described herein (e.g., process 800)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 700, 800, and/or any other functionality described herein.

Per block 702, some embodiments extract (e.g., generate) an intrinsic modality of one or more images based on using a first vision transformer (e.g., an MViT) of a vision-language model (e.g., CLIP) that is pre-trained on image-text pairs for a first set of domains. An "intrinsic modality" as described herein refers to one or more intrinsic descriptions of one or more features of one or more images. As described above, in some embodiments, an intrinsic description does not correspond to a natural language text caption of an image (or image feature) but rather corresponds to an un-normalized projected embedding or other neural network feature representation (e.g., a feature vector embedding). For example, in order to generate the intrinsic description some embodiments project one or more features of the image to a linear layer, where the image has no explicit text annotation associated with it. In some embodiments, after such intrinsic modality is generated, particular embodiments train on image-intrinsic modality pairs and/or text-image pairs as described, for example, with respect to FIGS. 2A and 2B. In some embodiments, block 702 includes or represents the functionality as described with respect to the multimodal branch 302 of FIG. 3. Or multimodal component 102 of FIG. 1.

Per block 704, some embodiments learn visual embeddings (i.e., a visual modality) for a second set of domains based on using a second vision transformer. For example, the first vision transformer may be the MViT 321 of FIG. 3 and the second vision transformer may be the ViT 319 of FIG. 3. In some embodiments, block 704 includes or represents the functionality as described with respect to the visual branch 312 of FIG. 3 or the visual component 112 of FIG. 1.

Per block 706, some embodiments fuse the intrinsic modality and the visual embeddings. In this way, more images across more domains and their descriptions (whether explicit text annotations and/or intrinsic descriptions) are captured. In some embodiments, the fusing at block 706 includes or represents the functionality as described with respect to the fusion module 316 of FIG. 3 and/or the fusion component 116 of FIG. 1. In some embodiments, the fusing at block 706 includes (or alternatively represents) combining the intrinsic modality and visual embeddings for particular content, where the combining is based on using a pre-trained vision transformer as a teacher network and distilling, via logit distillation, the intrinsic modality via a distillation token. In some embodiments, this represents or includes the functionality as described with respect to the soft distillation 403 of FIG. 4.

In some embodiments, the fusing at block 706 includes (or alternatively represents) fusing the intrinsic modality and visual embeddings for particular content, where the fusing includes using a distillation token to fuse the intrinsic modality in an input layer of a vision transformer. In some embodiments, such functionality includes the early fusion functionality as described with respect to FIG. 5.

In some embodiments, the fusing at block 706 includes (or alternatively represents) combining the intrinsic modality and visual embeddings for particular content, where the combining includes using a cross vision transformer to cross-attend multi-scale vision transformer features with vision transformer features. In some embodiments, this functionality includes the cross-attention functionality as described with respect to FIG. 6.

Figure 8:
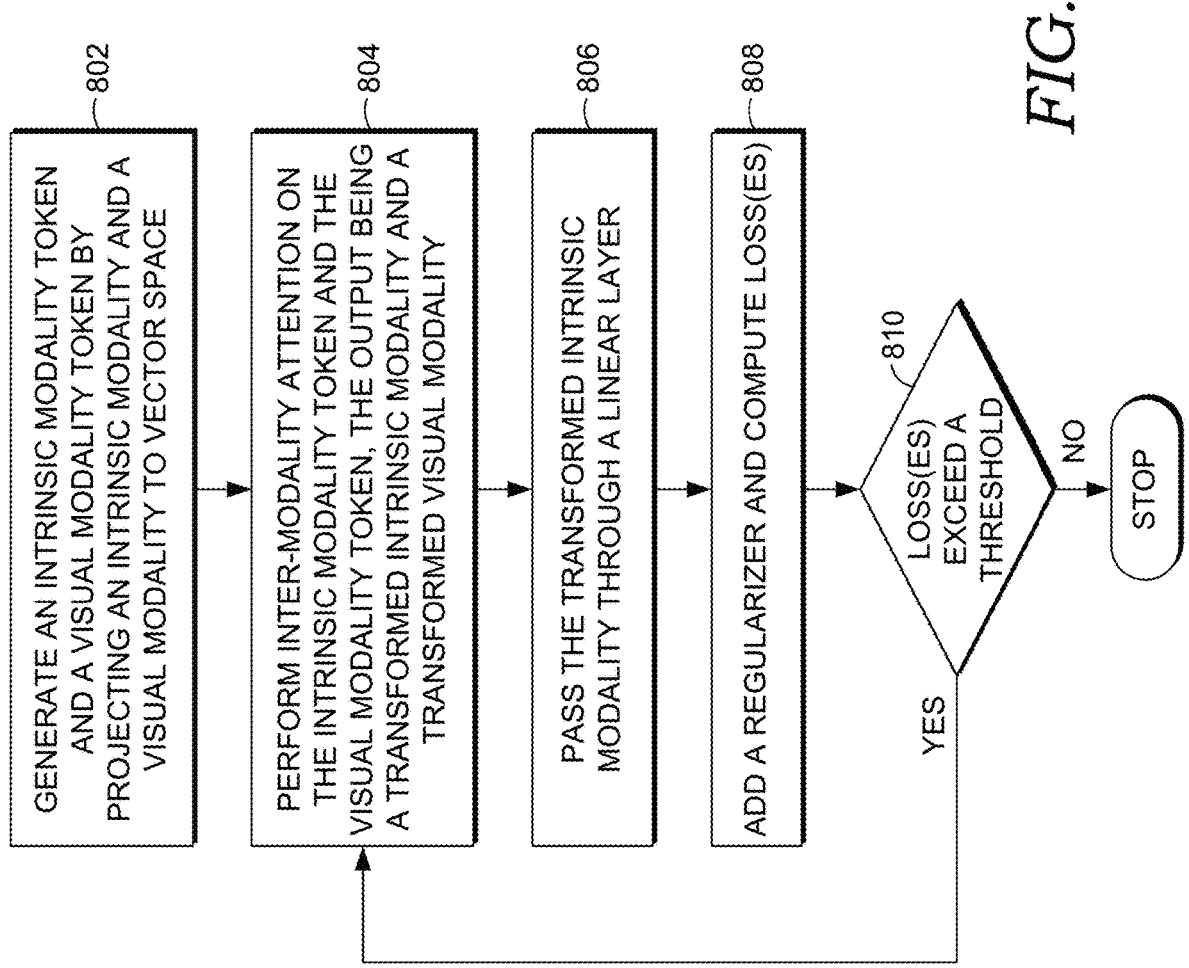
FIG. 8 is a flow diagram of an example process for learning how to fuse an intrinsic modality to a visual modality, according to some embodiments.

FIG. 8 is a flow diagram of an example process 800 for learning how to fuse an intrinsic modality to a visual modality, according to some embodiments. In some embodiments, the process 800 represents (or is preceded by the fusing step at block 706 of FIG. 7 since the process 800 represents specified training). Per block 802, particular embodiments generate an intrinsic modality token and a visual modality token by projecting an intrinsic modality and a visual modality to the same vector space. In some embodiments, this represents the beginning of the fusion step performed by the fusion module 316 as described with respect to FIG. 3.

Per block 804, some embodiments responsively perform inter-modality attention on the intrinsic modality token and the visual modality token, the output of which is a transformed intrinsic modality and a transformed visual modality. For example, some embodiments responsively perform a series of K multi-headed attention blocks (MSA) and feed-forward networks (FFN), as for example, indicated in equation 2 above.

Per block 806, some embodiments pass the transformed intrinsic modality through a linear layer to get class predictions and minimize cross-entropy loss. Per block 808, some embodiments add a regularizer and compute one or more losses. The regularizer minimizes classification loss on the transformed representation of the visual modality. In some embodiments, such one or more losses are computed via equation 3 described above. In this way, the model learns the best way to combine intrinsic modality and visual modality from the visual component 112. In other words, minimizing the loss helps determine what domains are missing in the model used to extract the intrinsic modality and model used in the visual branch and intelligently combines the images of varying domains to achieve a single representation. Accordingly, particular embodiments account for many more domains than a CLIP or other model could on its own such that there is higher domain generalization.

Figure 9:
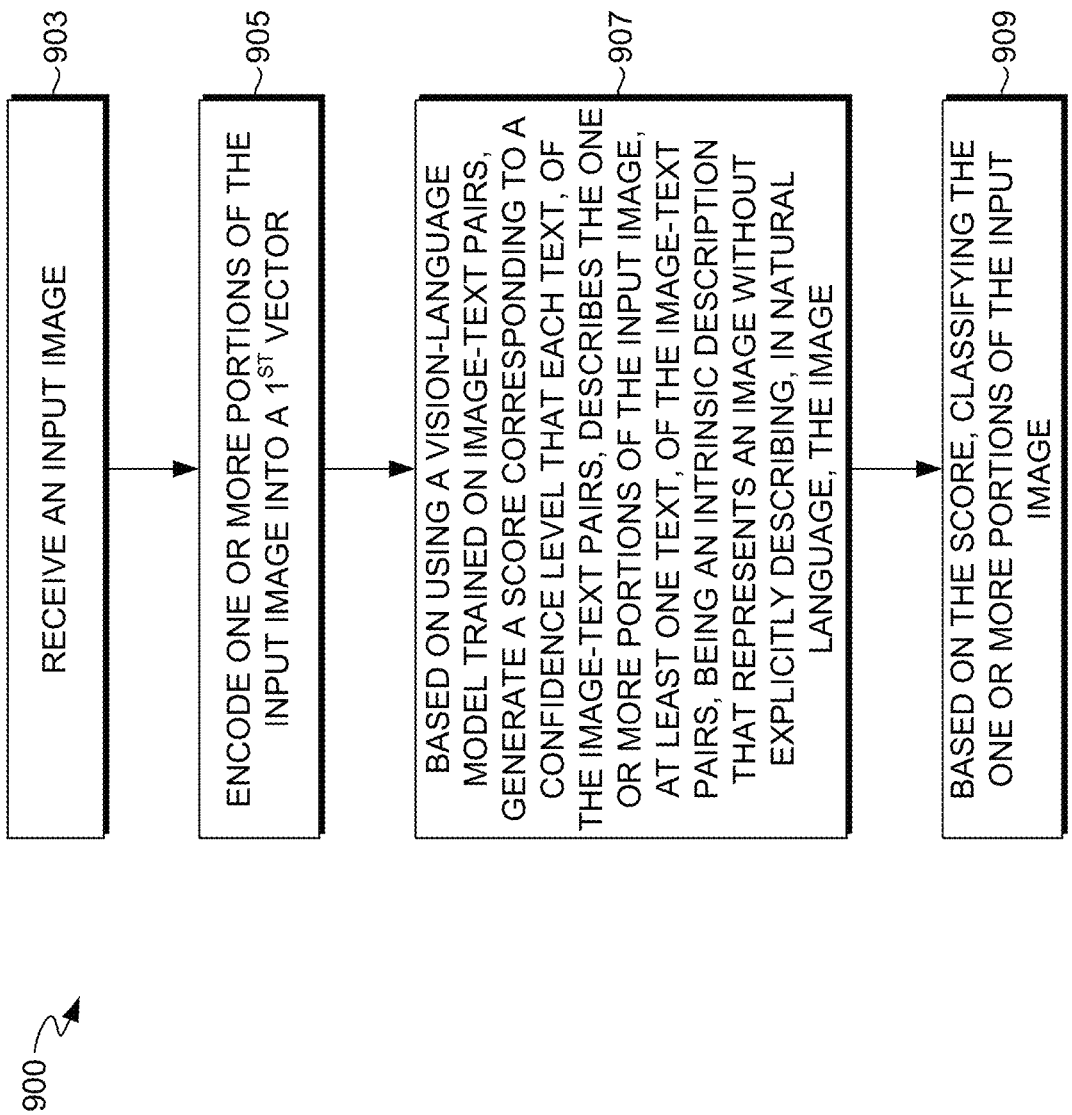
FIG. 9 is a flow diagram of an example process for classifying one or more portions of an input image, according to some embodiments.

FIG. 9 is a flow diagram of an example process 900 for classifying one or more portions of an input image, according to some embodiments. In some embodiments, the processes 700 of FIG. 7 and 800 of FIG. 8 represent offline or build-time functionality in order to train or fine-tune a language model. As such, in some embodiments, the process 900 represents a model that is trained using image-text and image-intrinsic description pairs and has learned how to fuse a visual branch with intrinsic modality (e.g., as described with respect to the process 800). In some embodiments, the process 900 represents runtime processing, such as after a model has been deployed. In alternative embodiments, the process 900 represents classifying during training and/or testing in order to train or adjust the model before deployment.

Per block 903, particular embodiments receive an input image. For example, particular embodiments may receive an indication that a user has uploaded a digital image (the input image) of a person riding a horse. Per block 905, some embodiments responsively encode one or more portions of the input image into a first vector. For example, a ViT splits the input image into visual tokens by dividing the image into fixed-size patches and then embeds each patch, which includes positional embedding as input (i.e., the first vector) to a transformer encoder. In some embodiments, the first vector represents only a portion or feature of the input feature. For example, if an image contains an animal object, the first vector may only represents the animal's eyes. In other embodiments, the first vector represents the entire input image. For example, the first vector can represent a concatenated vector (e.g., via a dot product) of each vector representing different features of the animal object. In other words, in some embodiments, the first vector can represents the entire animal object, which is a concatenation of all of its features, such as tail, eyes, tail, legs, and the like.

Per block 907, based on using a vision-language model (e.g., CLIP) trained on image-text pairs (e.g., via the training 202 and 208 of FIG. 2), some embodiments generate a score corresponding to a confidence level that each text, of the image-text pairs, describes the one or more portions of the input image. At least one text, of the image-text pairs being an intrinsic description (e.g., an intrinsic description extracted at block 802 of FIG. 8) that represents an image (or one or more features of the image) without explicitly describing, in natural language, the image like a text annotation does. For example, in some embodiments the score represents contrastive cosine distance computations. In an illustrative example of block 907, particular embodiments compute a distance (e.g., a cosine distance), in vector space, between the first vector and a set of vectors, where a second vector, of the set of vectors, corresponds to an explicit natural language description (i.e., a text annotation) of at least a portion of a first image, and where a third vector, of the set of vectors corresponds to an intrinsic description of at least a portion of a second image. In some embodiments, the intrinsic description corresponds to an un-normalized projected embedding that represents one or more features of the second image without explicitly describing, in natural language, the second image. In some embodiments, the "set of vectors" represent one or more vectors that have already been embedded in vector space based on contrastive learning during training. Likewise, the first image and the second image may represent historical images that a model has trained on already, whereas the "input image" represents a runtime image that the model has never seen or processed before.

Per block 909 based on the score, particular embodiments classify the one or more portions of the input image. For example, for the input image of a person riding a horse, a highest scored description may be a first text annotation that reads "person riding a horse," and particular embodiments responsively rank the first text annotation the highest. A middle scored description may be an intrinsic description of "[2, 3.4, 6, 4, 7]" that represents a person riding a donkey and particular embodiments rank the corresponding intrinsic description below the first text annotation. A lowest ranked description may be a second text annotation that reads "person riding a camel" and particular embodiments responsively rank the second text annotation the lowest—below the intrinsic description and the first text annotation. In some embodiments, the "classifying of the one or more portions" does not necessarily indicative of classifying an image, such as via a classifier, but can represent any suitable functionality, such as detecting an object in the input image (e.g., via object detection), image retrieval, image-synthesis, 3D recognition, video-understanding and the like.

In some embodiments, the classification at block 909 is based on further functionality, such as fusing one or more intrinsic descriptions of one or more training images (e.g., image-intrinsic description pairs) with one or more visual embeddings (or visual modality), as described with respect to block 706 of FIG. 7. In this way, particular embodiments consider many more domains when making classifications so that the classification is more likely to be accurate. For example, a multimodal branch may include a CLIP model that trained on recognizing horses only for a first domain (e.g., a drawing) and a second domain (e.g., a painting). However, a visual branch may include a vision transformer that is trained to recognize horses on a third domain (e.g., photograph). In a hypothetical scenario, the input image can be a photographic image of a person riding a horse. In this scenario, particular embodiments use the embeddings produced by the vision transformer that trained on horse photograph domain and the CLIP model for the first and second domains to help classify that the input image is of a person riding a horse.

Exemplary Experimental Results

Figure 10A:
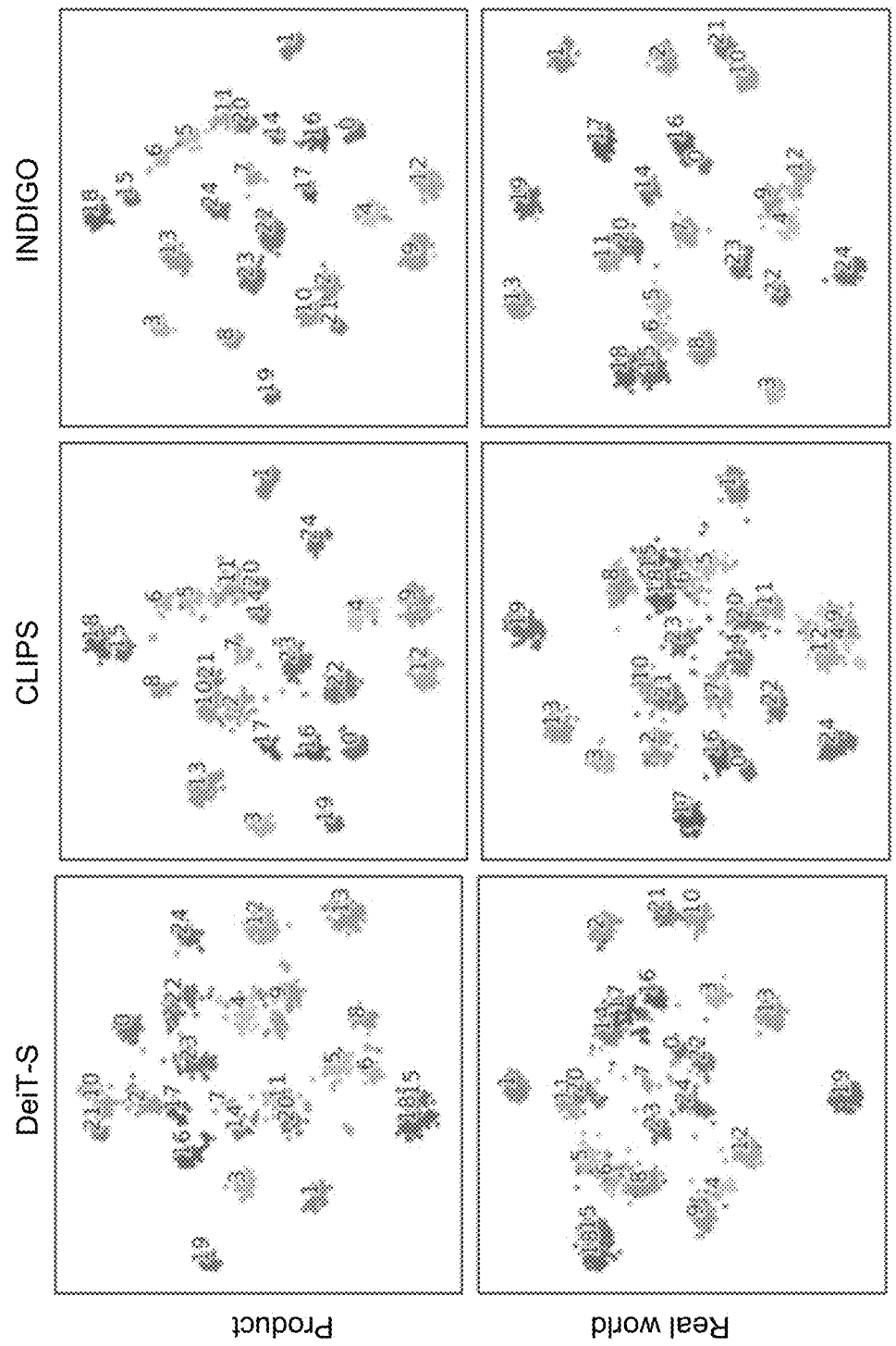
FIG. 10A illustrates t-distributed stochastic neighbor embedding (t-SNE) plots on Office-Home (ClosedDG), according to some embodiments.

The following information illustrates a few selected experimental results, which indicates classification and other accuracy improvements by using aspects of the present technology relative to existing technologies. FIG. 10A illustrates t-distributed stochastic neighbor embedding (t-SNE) plots on Office-Home (ClosedDG). Specifically, t-SNE is a statistical method for visualizing high-dimensional data by giving each data point (e.g., an image or image-text pair) a location in a two or three-dimensional map, which indicates classification accuracy. FIG. 10A specifically illustrates visualization of learned feature representations or vectors (e.g., final classifications) for existing technologies DeiT-S (standard AGG training), CLIP, as well as particular embodiments of the presents disclosure, labeled as "INDIGO" (e.g., embodiments that include each component of FIG. 1 or FIG. 3). With respect to FIG. 10A, "product" and "real world" are chosen as target domains for Office-Home dataset (under closed setting).

Figure 10B:
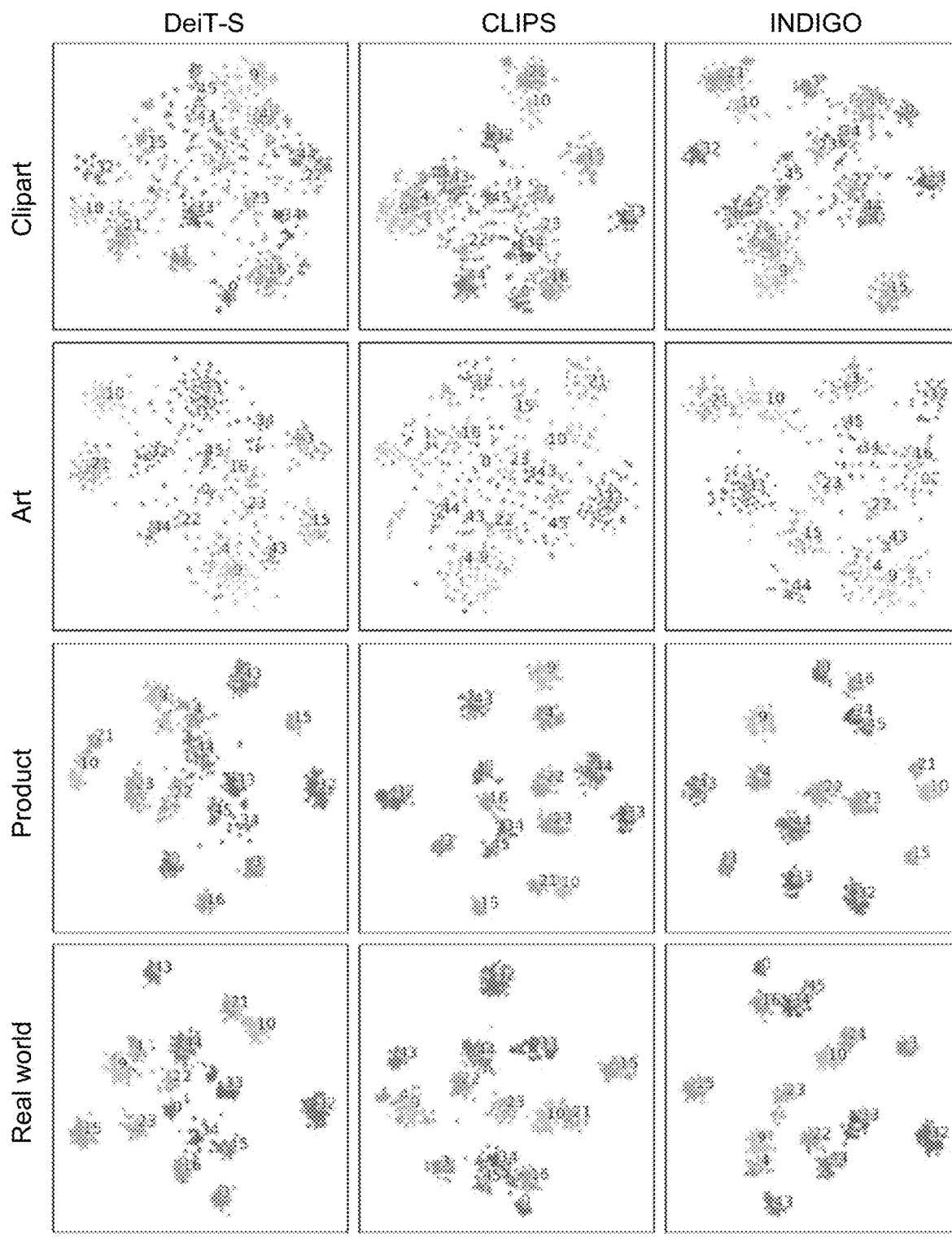
FIG. 10B illustrates t-SNE plots on Office-Home (OpenDG), according to some embodiments.

FIG. 10B illustrates t-SNE plots on Office-Home (OpenDG). FIG. 10B specifically illustrates a visualization of learned representations or vectors of existing technologies DeiT-S (standard AGG training), CLIP, as well as INDIGO. The chosen target domains are "clipart," "art," "product," and "real world."

With respect to FIG. 10A an 10B, they show additional t-SNE plots comparing representations learned by INDIGO, DeiT-S, and CLIP on target domains of Office-Home (a dataset) under (closed) DG (for 25 classes) and OpenDG (for 16 classes) setting, respectively. It is clearly seen that with respect to particular embodiments of the present technology (i.e., INDIGO), the plots are well segregated into class clusters and are more compact compared to DeiT-S and CLIP where the class data points are potentially leaked into other class clusters, resulting in miss-classifications. Therefore, particular embodiments shows better generalization performance and classification accuracy for these target domains.

Figure 11:
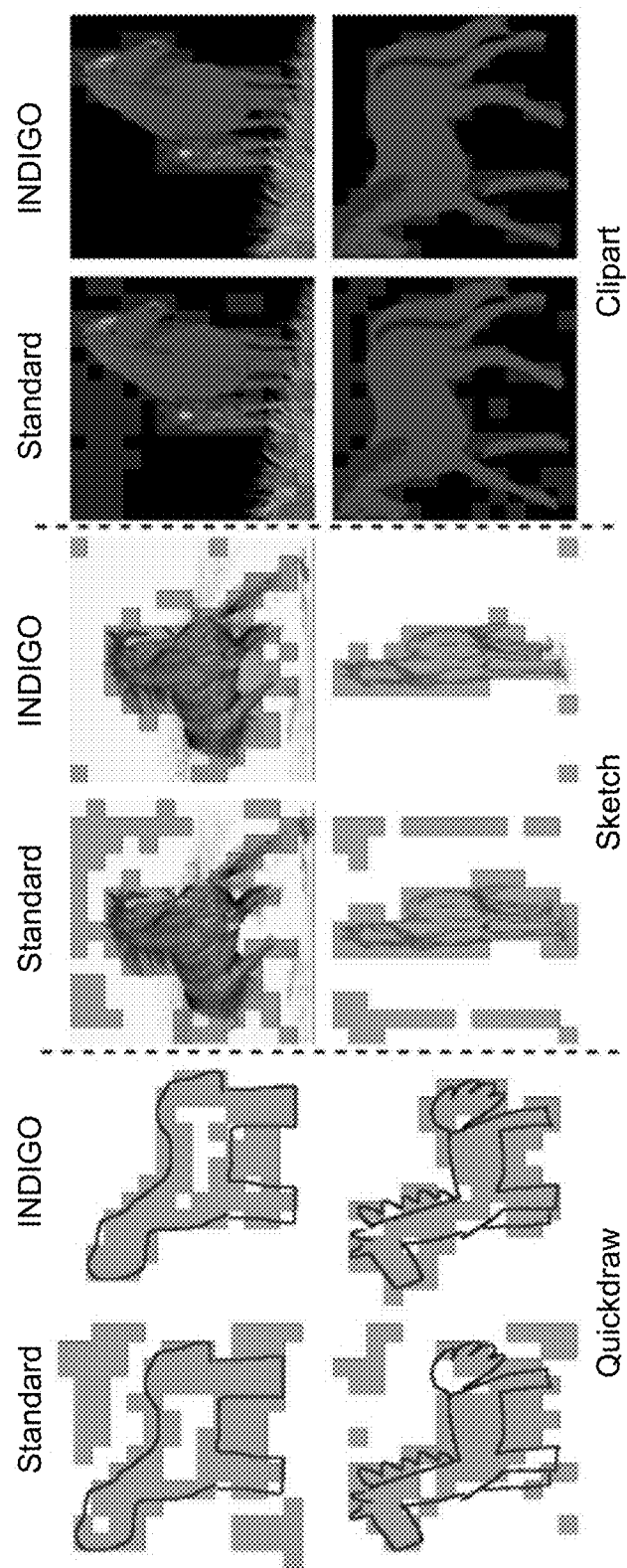
FIG. 11 depicts attention maps for different technologies across multiple domains, according to some embodiments.

FIG. 11 depicts attention maps for different technologies across multiple domains, according to some embodiments. The target domains are quickdraw, sketch, and Clipart, which each depict a horse. The technologies are DeiT-S labeled as "Standard," and "INDIGO" (i.e., particular embodiments of the present technology). Accordingly, a DeiT-S trained in vanilla (AGG) is compared with INDI- GO's visual branch (e.g., the visual component 112 of FIG. 1 or the visual branch 312 of FIG. 3). The inventors have observed that, when used in INDIGO pipeline, the vision transformer concentrates on foreground object in a scene (the picture of the horse) and better ignore the background or style. This confirms that attending with intrinsic modality, as described herein, in the fusion module (e.g., the fusion component 116 or the fusion module 316) helps the visual transformer exhibit more shape-bias than a vanilla one. The experiment is performed on DomainNet with quickdraw, sketch, and clipart as target domains separately.

Exemplary Operating Environments

Figure 12:
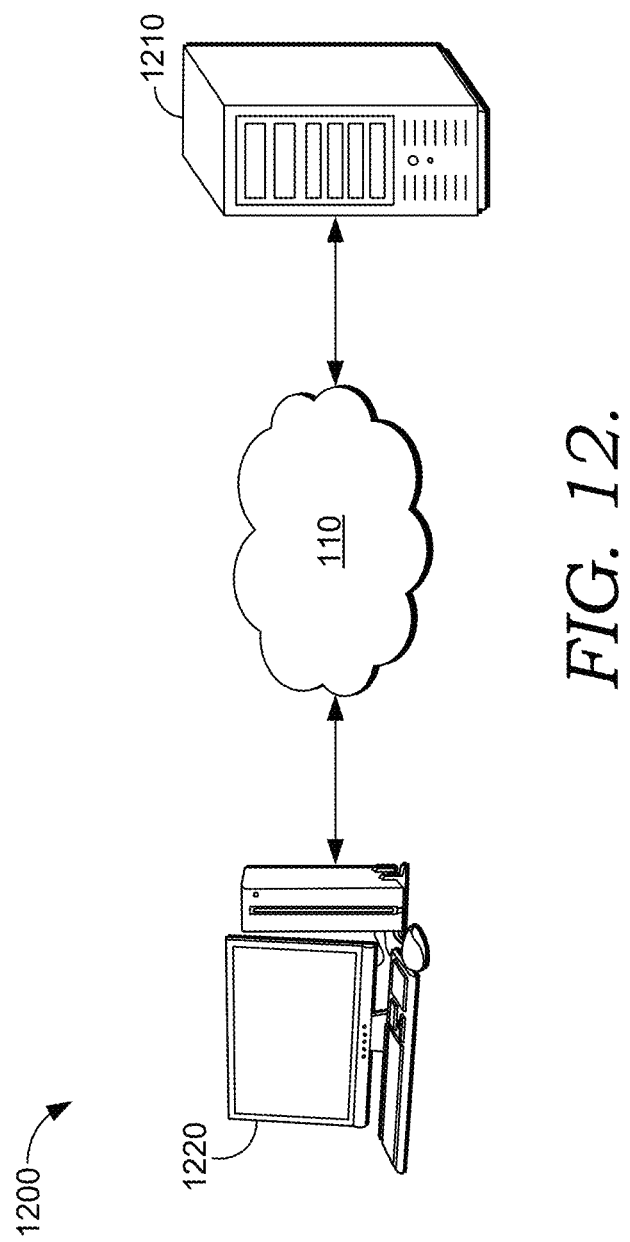
FIG. 12 is an example computer environment in which aspects of the present disclosure are employed, according to some embodiments.

Turning now to FIG. 12, a schematic depiction is provided illustrating an example computing environment 12000 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1210 that represent nodes in a cloud computing network. Various functions described herein as being performed by one or more entities may be carried out by hardware, firmware, and/or software. For instance, various functions may be carried out by a processor executing instructions stored in memory.

The environment 1200 depicted in FIG. 12 includes a prediction server ("server") 1210 that is in communication with a network(s) 110. The environment 1200 further includes a client device ("client") 1220 that is also in communication with the network(s) 110. Among other things, the client 1220 can communicate with the server 1210 via the network(s) 110, and generate for communication, to the server 1210, a request to classify one or more portions of an image, as described herein. In various embodiments, the client 1220 is embodied in a computing device, which may be referred to herein as a client device or user device, such as described with respect to the computing device 1300 of FIG. 13.

In some embodiments, each component in FIG. 1 is included in the server 1210 and/or the client device 1220. Alternatively, in some embodiments, the components of FIG. 1 are distributed between the server 1210 and client device 1220.

The server 1210 can receive the request communicated from the client 1220, and can search for relevant data via any number of data repositories to which the server 1210 can access, whether remotely or locally. A data repository can include one or more local computing devices or remote computing devices, each accessible to the server 1210 directly or indirectly via network(s) 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1210 is embodied in a computing device, such as described with respect to the computing device 1300 of FIG. 13.

Figure 13:
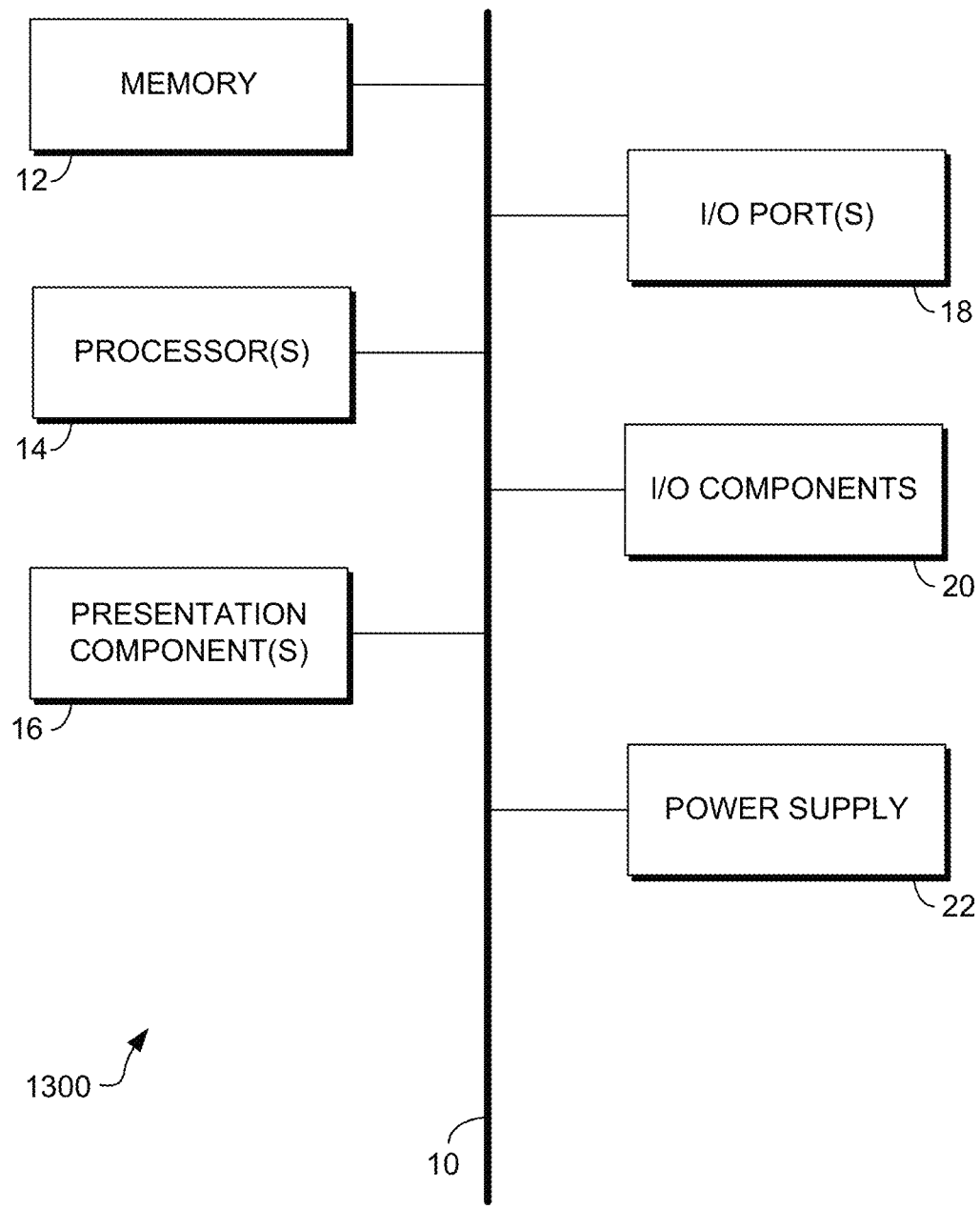
FIG. 13 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

Looking now to FIG. 13, computing device 1300 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1300 represents the client device 1220 and/or the server 1210 of FIG. 12.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 600 of FIG. 6, the process 700 of FIG. 7, the process 800 of FIG. 8, and/or any functionality described with respect to FIGS. 1 through 13.

I/O ports 18 allow computing device 1300 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 900 to render immersive augmented reality or virtual reality.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computerized system, the system comprising:
   one or more processors; and
   computer storage memory having computer-executable instructions stored thereon which, when executed by the one or more processors, implement operations comprising:
   receiving an input image;
   encoding the input image into at least a first vector that represents one or more portions the input image;
   computing a distance, in vector space, between the first vector and a set of vectors, a second vector, of the set of vectors, corresponding to an explicit natural language description of at least a portion of a first image, a third vector, of the set of vectors, corresponding to an intrinsic description of at least a portion of a second image, the intrinsic description corresponding to an un-normalized projected embedding that represents one or more features of the second image without explicitly describing, in natural language, the one or more features of the second image;
   based on the computing of the distance, generating a score for each vector, of the set of vectors, the score corresponding to a confidence level that each description describes the one or more portions of the input image;
   based on the score for each vector, ranking each vector, of the set of vectors; and
   based on the ranking, classifying the one or more portions of the input image.

2. The system of claim 1, wherein the operations further comprise generating the intrinsic description based on using a first vision transformer of a vision-language model that is pre-trained on image-text pairs.

3. The system of claim 2, wherein the set of vectors are associated with a first set of domains for particular content, and wherein the operations further comprise learning visual embeddings for a second set of domains for the particular content based on using a second vision transformer.

4. The system of claim 3, wherein the operations further comprising fusing the intrinsic description and the visual embeddings, and wherein the classification of the input image is based on the fusing.

5. The system of claim 1, wherein the operations further comprise combining the intrinsic description and visual embeddings for particular content, and wherein the combining is based on using a pre-trained vision transformer as a teacher network and distilling, via logit distillation, the intrinsic description via a distillation token.

6. The system of claim 1, wherein the operations further comprising fusing the intrinsic description and visual embeddings for particular content, and wherein the fusing includes using a distillation token to fuse the intrinsic description in an input layer of a vision transformer.

7. The system of claim 1, wherein the operations further comprising combining the intrinsic description and visual embeddings for particular content.

8. The system of claim 7, wherein the combining includes using a cross vision transformer to cross-attend multi-scale vision transformer features with vision transformer features.

9. The system of claim 1, wherein the generating of the score is based on using a vision-language model, and wherein operations further comprising training the vision-language model by:
   generating an intrinsic modality token and a visual modality token by projecting an intrinsic modality and a visual modality to vector space;
   performing inter-modality attention on the intrinsic modality token and the visual modality token;
   based on the inter-modality attention, generating a transformed intrinsic modality and a transformed visual modality; and
   minimizing one or more losses, and wherein the minimizing of the one or more losses corresponds to learning how to combine the intrinsic modality and the visual modality for classification.

10. A computer-method comprising:
    receiving an input image;
    encoding one or more portions of the input image into a first vector;
    based on using a vision-language model trained on image-text pairs, generating a score corresponding to a confidence level that each text, of the image-text pairs, describes the one or more portions of the input image, at least one text, of the image-text pairs, corresponding to an intrinsic description that represents one or more features of an image without explicitly describing, in natural language, the one or more features of the image; and
    based on the score, classifying the one or more portions of the input image.

11. The computer-implemented method of claim 10, further comprise generating the intrinsic description based on using a first vision transformer of a vision-language model that is pre-trained on image-text pairs.

12. The computer-implemented method of claim 11, wherein the image-text pairs are associated with a first set of domains for particular content, and wherein the computer-implemented method further comprising learning visual embeddings for a second set of domains for the particular content based on using a second vision transformer.

13. The computer-implemented method of claim 12, further comprising fusing the intrinsic description and the visual embeddings, and wherein the classification of the one or more portions of the input image is based on the fusing.

14. The computer-implemented method of claim 10, further comprising combining the intrinsic description and visual embeddings for particular content, and wherein the combining is based on using a pre-trained vision transformer as a teacher network and distilling, via logit distillation, the intrinsic description via a distillation token.

15. The computer-implemented method of claim 10, further comprising fusing the intrinsic description and visual embeddings for particular content, and wherein the fusing includes using a distillation token to fuse the intrinsic description in an input layer of a vision transformer.

16. The computer-implemented method of claim 10, further comprising combining the intrinsic description and visual embeddings for particular content, and wherein the combining includes using a cross vision transformer to cross-attend multi-scale vision transformer features with vision transformer features.

17. The computer-implemented method of claim 10, further comprising training the vision-language model by:
- generating an intrinsic modality token and a visual modality token by projecting an intrinsic modality and a visual modality to vector space;
- performing inter-modality attention on the intrinsic modality token and the visual modality token;
- based on the inter-modality attention, generating a transformed intrinsic modality and a transformed visual modality; and
- minimizing one or more losses, and wherein the minimizing of the one or more losses corresponds to learning how to combine the intrinsic modality and the visual modality for classification.

18. A computerized system comprising:
- an image encoding means for encoding one or more portions of an input image into a first vector; and
- a classification means for generating a score corresponding to a confidence level that each text, of the image-text pairs, describes the one or more portions of the input image based on using a vision-language model trained on image-text pairs, at least one text, of the image-text pairs, corresponding to an intrinsic description that represents one or more features of an image without explicitly describing, in natural language, the one or more features of the image,
- wherein the classification means is for further classifying the one or more portions of the input image based on the score.

19. The computerized system of claim 18, wherein the image-text pairs are associated with a first set of domains for particular content, and wherein the computerized system further comprises a visual means for learning visual embeddings for a second set of domains for the particular content based on using a vision transformer.

20. The computerized system of claim 19, further comprising a fusion means for fusing the intrinsic description and the visual embeddings, and wherein the classification of the one or more portions of the input image is based on the fusing.

* * * * *